(12) United States Patent
Fukuyama et al.

(10) Patent No.: US 7,874,575 B2
(45) Date of Patent: Jan. 25, 2011

(54) AIRBAG APPARATUS

(75) Inventors: Takaki Fukuyama, Aichi-ken (JP); Hiroki Murase, Aichi-ken (JP); Yasushi Okada, Aichi-ken (JP); Kenichi Fukurono, Aichi-ken (JP); Toru Ozaki, Aichi-ken (JP); Ichizo Shiga, Aichi-ken (JP); Yuki Nonoyama, Aichi-ken (JP)

(73) Assignee: Toyoda Gosei Co., Ltd., Aichi (JP)

( * ) Notice: Subject to any disclaimer, the term of this patent is extended or adjusted under 35 U.S.C. 154(b) by 175 days.

(21) Appl. No.: 12/222,387

(22) Filed: Aug. 7, 2008

(65) Prior Publication Data

US 2009/0045607 A1 Feb. 19, 2009

(30) Foreign Application Priority Data

Aug. 10, 2007 (JP) ............... 2007-210157
Nov. 21, 2007 (JP) ............... 2007-301925

(51) Int. Cl.
*B60R 21/20* (2006.01)
*B60R 21/26* (2006.01)

(52) U.S. Cl. .................. 280/728.2; 280/740
(58) Field of Classification Search ............ 280/728.2, 280/740, 742
See application file for complete search history.

(56) References Cited

U.S. PATENT DOCUMENTS

| | | | | |
|---|---|---|---|---|
| 5,836,608 A | | 11/1998 | Soderquist et al. | |
| 6,062,591 A | * | 5/2000 | Ruckdeschel et al. | 280/728.2 |
| 6,149,192 A | * | 11/2000 | Swann et al. | 280/740 |
| 7,150,470 B2 | * | 12/2006 | Okada et al. | 280/743.1 |
| 2003/0222434 A1 | * | 12/2003 | Okada et al. | 280/728.1 |
| 2005/0212274 A1 | * | 9/2005 | Massanetz et al. | 280/740 |
| 2006/0028008 A1 | * | 2/2006 | Magoley et al. | 280/736 |

FOREIGN PATENT DOCUMENTS

| | | |
|---|---|---|
| JP | A-3-049669 | 1/1998 |
| JP | A-2004-001636 | 1/2004 |

* cited by examiner

*Primary Examiner*—Paul N Dickson
*Assistant Examiner*—Joseph Rocca
(74) *Attorney, Agent, or Firm*—Posz Law Group, PLC

(57) ABSTRACT

The airbag apparatus is provided with a retainer that includes a hold-down portion for attachment of a periphery of a gas inlet of an airbag to the case, a cover wall surrounding an inflator body, deflectors and catches. The cover wall includes a plurality of outlet ports for releasing inflation gas exited discharge ports of the inflator body radially. The deflectors deflect the inflation gas exited the outlet ports in a range of angle from a direction orthogonal to an axis of the inflator body to a downward direction extending toward the hold-down portion. The catches capture residual particles contained in the inflation gas when the gas deflected by the deflectors hit them.

11 Claims, 23 Drawing Sheets

AIRBAG APPARATUS

The present application claims priority from Japanese Patent Application No. 2007-210157 of Fukuyama et al., filed on Aug. 10, 2007, Japanese Patent Application No. 2007-301925 of Fukuyama et al., filed on Nov. 21, 2007, the disclosures of which are hereby incorporated into the present application by reference.

BACKGROUND OF THE INVENTION

1. Field of the Invention

The present invention relates to an airbag apparatus mountable on a vehicle and, more particularly, to an airbag apparatus including a pyrotechnic inflator that generates gas for inflating an airbag by chemical reaction.

2. Description of Related Art

A conventional airbag apparatus is known from Japanese Utility Model Registration No. 3,049,669 or U.S. Pat. No. 5,836,608 corresponding thereto. The airbag apparatus includes an inflatable airbag provided with a gas inlet, an inflator for supplying the airbag with inflation gas, a case for housing the airbag and inflator, and an annular retainer for holding down a periphery of the gas inlet port of the airbag for attaching the airbag to the case. When an airbag apparatus employs a pyrotechnic inflator that generates inflation gas by chemical reaction, the gas exited the inflator may contain hot residual particles that can damage the airbag if not removed or cooled off before reaching the airbag. To solve this problem, the above-mentioned airbag apparatus includes on the retainer a guide wall that deflects inflation gas exited the inflator away from the periphery of the gas inlet port of the airbag.

Another conventional airbag apparatus is known in JP 2004-001636A. This apparatus is provided on the retainer with a catch wall for catching such residual particles. The catch wall is tubular in shape and disposed around gas discharge ports of the inflator. The catch wall includes orifices for releasing inflation gas radially outwardly and catches residual particles by peripheral areas of the orifices when the gas passes through the orifices.

However, in the airbag apparatus disclosed in the former reference, the guide wall is simply oriented outwardly in order to deflect inflation gas away from the peripheral area of the gas inlet port of the airbag. This configuration still may deliver hot residual particles to a portion of the airbag that remains folded proximate the inflator, if not the peripheral area of the gas inlet port, in the initial stage of airbag inflation.

Moreover, in the airbag apparatus disclosed in the latter reference, the catch wall is a single tubular wall surrounding the gas discharge ports. With this configuration, if the inflator includes numerous gas discharge ports, the gas successively discharged from the discharge ports may hit the particles once caught by the catch wall and blow them off toward the airbag. These particles may damage the airbag if not have been cooled off enough by the catch wall. A reinforcing element that has been applied to a conventional airbag in order to cope with this problem has complicated the manufacturing process and increased manufacturing cost.

In another aspect, such configuration as to get rid of or lessen a heavy filter from the inflator in the light of weight reduction is likely to increase hot residual particles in inflation gas discharged from gas discharge ports of the inflator.

SUMMARY OF THE INVENTION

The object of the present invention is to provide an airbag apparatus that is capable of securely capturing residual particles contained in inflation gas exited an inflator so as to reduce damages that an airbag may sustain otherwise.

The airbag apparatus of the invention includes an airbag provided with a gas inlet port, a pyrotechnic inflator, a case, a retainer, a cover wall, deflectors and catches. The inflator generates a gas for inflating the airbag by chemical reaction and includes a columnar body that has on and along an outer circumference of an upper part thereof discharge ports for discharging the gas. The case houses the airbag in a folded state and holds the inflator. The case includes an insert hole for receiving the upper part of the inflator body where the discharge ports are located and a mounting seat arranged around the insert hole on its upper face to which mounting seat a peripheral region of the inlet port of the airbag is attached. The retainer is annular in shape and attaches the peripheral region of the inlet port of the airbag to the mounting seat. The retainer includes a hold-down portion that holds down the peripheral region of the inlet port of the airbag and is mounted on the case. The cover wall has a tubular contour and is disposed around and proximate the outer circumference of the inflator body set in the case in such a manner as to extend upwardly from the vicinity of an inner edge of the hold-down portion of the retainer. The cover wall includes a plurality of outlet ports formed intermittently to face the circumference of the inflator body so as to release the gas exited the discharge ports of the inflator body generally in a direction orthogonal to an axis of the inflator body and radially about the inflator body. Each of the deflectors is formed to oppose one of the outlet ports on the outside of the cover wall and above the hold-down portion of the retainer for deflecting the gas exited the outlet port of the cover wall away from the outlet port and within a range of angle from the direction orthogonal to the axis of the inflator body to a downward direction extending toward the hold-down portion. Each of the catches is located around the outlet port outside of the cover wall for capturing residual particles contained in the gas when receiving the gas deflected by the deflector.

Unless otherwise noted, this specification is and will be described as the up (versus the down) refers to a direction to which a distal end of the inflator body provided with discharge ports of gas is oriented. In other words, the up is intended to refer to a direction extending toward an interior of the airbag along an axial center of the gas inlet port of the airbag, which conforms to the axial center of the inflator body. Therefore, the up/down in this specification is not limited to actual up/down of a vehicle to be equipped with the airbag apparatus.

In operation of the airbag apparatus, inflation gases exit the gas discharge ports of the inflator along the directions orthogonal to the axial center of the inflator body. The gases reach the cover wall of the retainer and pass through the outlet ports generally along the directions orthogonal to the axis of the inflator body and radially about the inflator body. Then the gases are deflected by the deflectors located to correspond to each of the outlet ports and hit the catches. At this time residual particles contained in the gases, which are tacky and heavier than the gases, adhere to and get captured by the catches while cleaned-up gases get deflected by the catches and flow into the airbag.

In the airbag apparatus of the invention, the outlet ports are formed intermittently along the circumference of the inflator body such that inflation gases exited the discharge ports of the inflator body outflow generally in the directions orthogonal to the axis of the inflator body and radially about the inflator body. Further, the deflectors respectively correspond to one specific outlet port. With this configuration, an inflation gas exited a specific outlet port hits only a corresponding deflector and catch. Accordingly, the gas exited the specific outlet port keeps hitting the corresponding catch. Other gases exited adjoining outlet ports can hit the catch corresponding to the specific outlet port only after they hit adjoining deflectors and catches that correspond to the adjoining outlet ports. The other gases at this point do not have such high flow speed as to thrust back the gas from the catch corresponding to the specific outlet port and hit this catch. Consequently, a gas exited a certain outlet port only hits a specific catch, so that residual particles once caught by the specific catch are prevented from being blown off by other gases from different directions. Accordingly, each of the catches captures more residual particles in an accumulating manner.

Moreover, each of the deflectors deflects an inflation gas exited a specific outlet port away from the specific outlet port and within a range of angle from a direction orthogonal to the axial center of the inflator body (i.e. a direction parallel to the hold-down portion, the periphery of the inlet port of the airbag, or the mounting seat of the case, which includes a radially extending direction from and a circumferential direction about the axial center of the inflator body) to a downward direction extending toward the hold-down portion. In other words, the deflectors deflect the gases away from upward. Accordingly, inflation gases containing residual particles are prevented from flowing directly upward, i.e. toward the airbag. To paraphrase, inflation gases never fail to pass the catches before heading for the interior of the airbag, so that cleaned-up gases are fed to the airbag.

Therefore, the airbag apparatus of the invention captures residual particles contained in inflation gases securely and helps prevent the residual particles once captured from being blown off. As a result, the airbag is fed with cleaned-up gases and thereby reducing damages that the airbag may sustain otherwise because of the particles.

It is desired that the outlet ports are equal in number to the discharge ports of the inflator body and each of the outlet ports is located on an extension of a discharging direction of a gas exiting from one specific discharge port corresponding to the outlet port.

With this configuration, an inflation gas exited one specific discharge port flows along the discharging direction and immediately passes through the cover wall via the corresponding outlet port, and then passes locations of the corresponding deflector and catch. That is, the gas exited the specific discharge port is securely prevented from heading for adjoining outlet ports. This further makes the gas exited the specific outlet port hit the corresponding catch in a stable manner such that the catch captures more residual particles. As a result, further cleaned-up inflation gases are supplied into the airbag.

In above case, insofar as the outlet ports are configured to release inflation gases to directions orthogonal to the axis of the inflator body and radially about the inflator body, the cover wall may be located separate from the outer circumference of the inflator body by a clearance or may be located such that peripheries of the outlet ports on an inner surface of the cover wall abut against peripheries of the discharge ports on the outer circumference of the inflator body. In an instance where a clearance is provided between the cover wall and inflator body, an inflation gas exited a specific discharge port is prevented from flowing out of adjoining outlet ports because it is blocked by the cover wall before reaching the adjoining outlet ports, even though an inflation gas is discharged from a discharge port with a certain spray angle. If the cover wall abut against the outer circumference of the inflator body, an inflation gas exited a specific discharge port immediately pass a corresponding outlet port communicating therewith even though the gas is discharged with a spray angle.

In the instance where a clearance is provided between the cover wall and inflator body, the outlet ports do not necessarily have to be located on extensions of the discharging directions of gases exiting from the discharge ports insofar as the outlet ports are configured to release inflation gases to directions orthogonal to the axis of the inflator body and radially about the inflator body. For example, the outlet ports may be interposed between adjoining discharge ports. In this case, gases exited adjoining discharge ports hit each other and join together in the clearance between the cover wall and inflator body and then smoothly flow out of an outlet port interposed between the adjoining discharge ports. If an airbag apparatus is designed such that gases once fill up the clearance between the cover wall and inflator body and then are released from the outlet ports, the gases flow out of the outlet ports to directions orthogonal to the axis of the inflator body and radially about the inflator body.

The cover wall desirably includes a restriction wall that connects an upper hem of each of the outlet ports and an upper end of each of the deflectors for preventing an upward outflow of inflation gas.

Such restriction wall will prevent inflation gas from heading for the airbag when the gas passes the outlet port and securely help guide the gas to the deflectors, thereby preventing the gas from directly flowing into the airbag as contains residual particles and inhibiting damages that the airbag may sustain otherwise due to the particles.

The deflector may be formed separately from the catch and may be configured to concurrently act as the catch as well. In order to make the deflector serve as the catch as well, each of the deflectors is formed to stand vertically on a radially extending position about the axial center of the inflator body at each of the outlet ports and include, between both ends thereof in the circumferential direction of the inflator body and the cover wall, clearances each of which acts as an exit hole that releases an inflation gas toward opposite directions along the circumferential direction of the inflator body after the gas hit the deflector. A side of the deflector opposing the outlet port serves as a catching plane that captures residual particles of the gas when the gas exits from the exit holes.

With this configuration, inflation gases passed the outlet ports of the cover wall and hit the deflectors bifurcate into opposite directions along the circumference of the inflator body from the exit holes formed on the both ends of the deflectors. At this time, tacky and heavy residual particles contained in the gas adhere to the opposing planes of the deflectors, and subsequent particles accumulate on the catches. As a result, cleaned-up gases are fed to the airbag. That is, the deflectors concurrently act as the catches by making their planes opposing the outlet ports act as the catching planes.

Besides, since inflation gases bifurcate into opposite directions along the circumference of the inflator body upon hitting the opposing planes of the deflectors, the gases lose some velocity before heading for the airbag, so that the airbag is prevented from abruptly and straightly projecting toward a vehicle occupant.

In order to provide the deflectors and catches separately, each of the deflectors may be configured for example to deflect an inflation gas exited the outlet port downward toward the hold-down portion and to include an exit hole at a lower edge thereof located above the hold-down portion by a clearance for releasing the gas hit the deflector along the hold-down portion and radially about the axial center of the inflator body. Regions on a top plane of the hold-down portion opposing such exit holes act as the catches for capturing residual particles of the gas.

With this configuration, inflation gases exited the outlet ports of the cover wall hit the deflectors and get deflected downward toward the hold-down portion and bump catching planes of the catches formed on the top plane of the hold-down portion. Then the gases flow radially outwardly about the axial center of the inflator body via the exit holes formed between the lower edges of the deflectors and the hold-down portion or the catches. When the gases hit the catches and turn outwardly, tacky and heavy residual particles adhere to the catching planes, and subsequent particles accumulate on the catches. As a result, cleaned-up gases are fed to the airbag.

Moreover, since above configuration deflects inflation gases twice; firstly by the deflectors and then by the catching planes of the catches, it further reduces the momentum of the gases before reaching the airbag, and therefore, the airbag is prevented from abruptly and straightly projecting toward a vehicle occupant.

The retainer desirably includes an outer tubular portion having a tubular contour that is continuous with an entire outer circumference of the hold-down portion and is greater in height than a top of the cover wall.

The outer tubular portion guides inflation gases upward and blocks the gases from a region of the airbag surrounding the retainer even though the gases flow circumferentially about the inflator body or flow radially about the axis of the inflator body on the hold-down portion after passing the deflectors and catches. Accordingly, the region of the airbag is protected from the gases. The outer tubular portion also captures residual particles of the gas that the catches failed to capture by its inner surface, thereby conducing to feed further cleaned-up gases to the airbag.

If the cover wall is so formed on the case as to extend upwardly from a periphery of the insert hole of the case or so formed on the retainer as to extend upwardly from an inner circumference of the hold-down portion, the number of parts and processes of assembling will be reduced in comparison with an instance where the cover wall is formed separately from the case or retainer.

If the case is formed of a sheet metal and configured to include the cover wall, the cover wall may be formed to be continuous with an entire periphery of the insert hole by drawing. If that is unworkable, the cover wall may be comprised of a plurality of lugs that are formed by cutting and raising portions of the sheet metal on a location of the insert hole on the bottom wall of the case and disposed intermittently along the periphery of the insert hole to include each one said outlet port. In this case, the retainer is configured to include a generally cylindrical ring post that extends upward from the hold-down portion and surrounds the lugs to support the lugs for preventing such deformation of the lugs as back away from the inflator body.

Such lugs are comprised of the portions of the sheet metal on the location of the insert hole of the case that would otherwise be punched out for discard, and therefore, conduce to making efficient use of the material. The lugs are easy to deform since they are intermittently formed along the periphery of the insert hole and supported at only one ends like a cantilever. However, the ring post extending from the hold-down portion of the retainer supports and prevents the lugs from deforming away from the inflator body even if inflation gases flowing outwardly hit the lugs. Therefore, the outlet ports and peripheries thereof of the lugs stay in place and allow the gases to flow steadily toward the deflectors and catches.

It is desired that each of the lugs include a restriction wall that connects the upper hem of the outlet port and the upper end of the deflector for preventing an upward outflow of inflation gas, and that the ring post includes at a top region thereof a support wall for supporting the lugs and apertures located below the support wall for receiving the deflectors from an inner side. Further, the lugs are desirably so configured as to bend upward such that the deflectors are set in the apertures of the ring post when pushed by the inflator body set in the insert hole of the case from the lower side.

With this configuration, the deflectors are smoothly set in the apertures of the ring post to project outwardly in assembling of the inflator with the case even if the deflectors are formed to project largely from the peripheries of the outlet ports. Since the deflectors can be formed large, the outlet ports can be enlarged as well so that inflation gases exited the discharge ports of the inflator smoothly flow toward the deflectors via the outlet ports. Further, since the peripheries of the outlet ports contact the inflator body, the gases exited the discharge ports immediately pass through the outlet ports communicated therewith and head for the deflectors even if the gases are discharged with a certain spray angle. In addition, the restriction walls prevent upward outflows the gases when the gases pass through the outlet ports of the cover wall, and thereby preventing the gases from directly flowing into the airbag as contains residual particles. Accordingly damages to the airbag by the residual particles will be reduced.

On the contrary, if the cover wall is formed on the retainer in such a manner as to extend upwardly from the inner edge of the hold-down portion of the retainer, the retainer desirably includes a flange that extends up to the vicinity of an inner edge of the insert hole of the case at a lower side of the outlet ports.

Such flange will cover the peripheral region of the gas inlet port of the airbag located below the outlet ports and protects the peripheral region from hot inflation gases discharged from the discharge ports of the inflator body.

In this case, the retainer is desirably comprised of two parts: an upper part that constitutes an upper side of the hold-down portion including the cover wall and deflectors and includes at an outermost region thereof an annular attachment ring provided with a plurality of attaching elements for attaching the whole retainer to the periphery of the insert hole of the case; and a lower part that constitutes a lower side of the hold-down portion and includes the flange of the retainer, an annular hold-down ring provided with through holes for receiving the attaching elements, and an outer tubular portion that is formed continuous with an entire outer circumference of the hold-down portion outside of the attachment ring of the upper part and is greater in height than a top of the cover wall.

This configuration will facilitate the manufacturing of such a retainer as includes the flange and outer tubular portion that protect regions of the airbag disposed inside of the cover wall and outside of the hold-down portion. Specifically, the lower part has only to form the lower side of the retainer, and does not have to be provided with the cover wall or deflectors. Therefore, it is easily manufactured by applying pressing work to a sheet metal, into such contour as has a U-shaped section. The upper part has the cover wall provided with the outlet ports and deflectors and the attachment ring provided with the attaching elements. It will be difficult by pressing work to manufacture such a single-entity retainer as includes the outlet ports, the flange extending inward beyond the lower edges of the outlet ports, together with the attachment ring that is disposed up to the outer peripheral edge and provided with the attaching elements. However, with the above configuration, the upper part does not have to be provided with the flange since the flange is formed on the lower part.

Therefore, the above configuration will facilitate the manufacturing of the retainer that includes such flange as to protect the portion of the airbag inside the cover wall and such outer tubular portion as to protect the other portion of the airbag outside the hold-down portion. Additionally, the upper part and lower part are assembled together for attachment to the mounting seat of the case simply by inserting the attaching elements of the upper part into the through holes of the lower part and then through the mounting seat. Accordingly, separate attaching means are not required for assembling the upper part and lower part.

DESCRIPTION OF THE PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
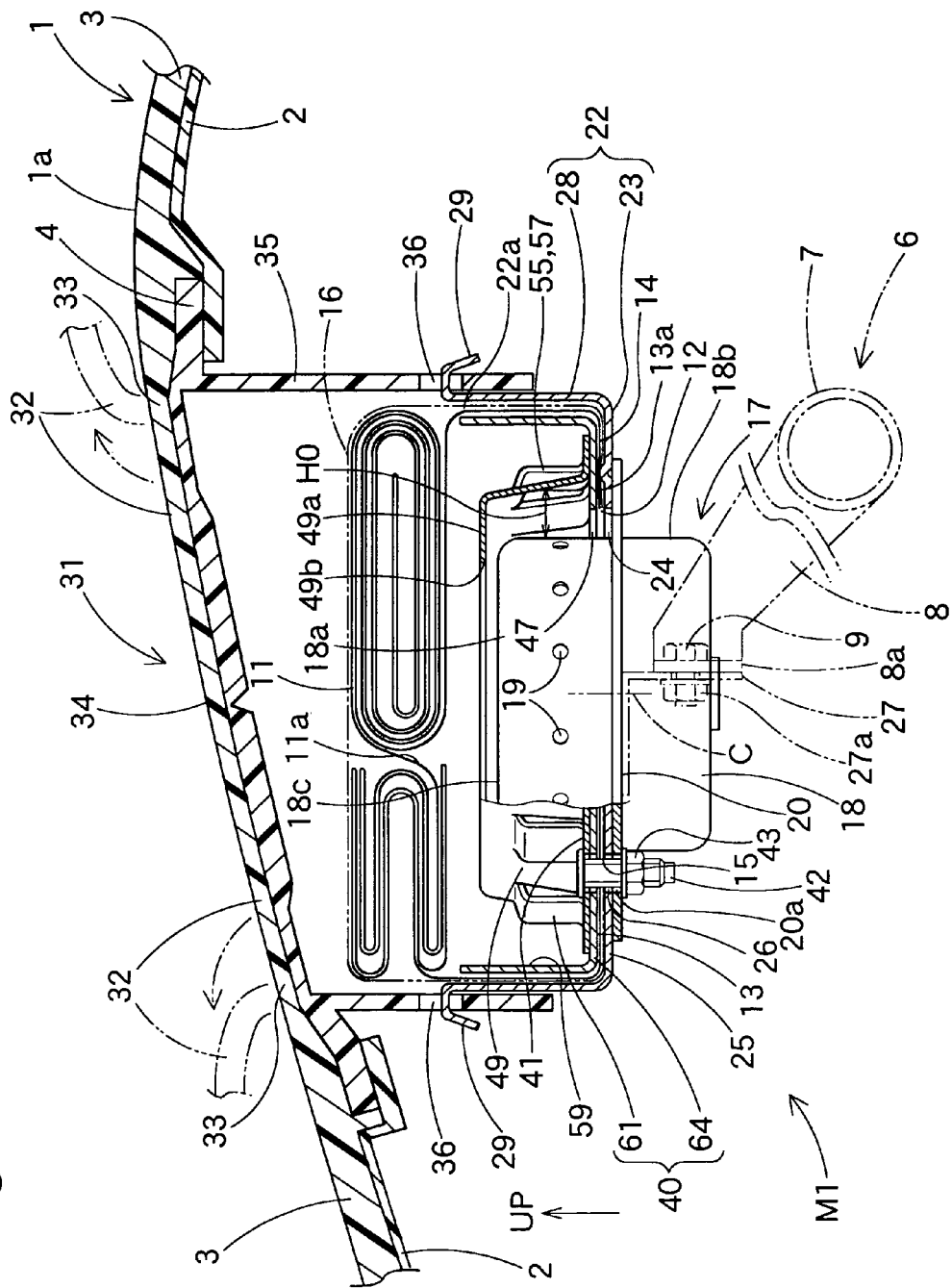
FIG. 1 is a schematic vertical section of an airbag apparatus according to the first embodiment of the invention, taken along a longitudinal direction of a vehicle.
Figure 2:
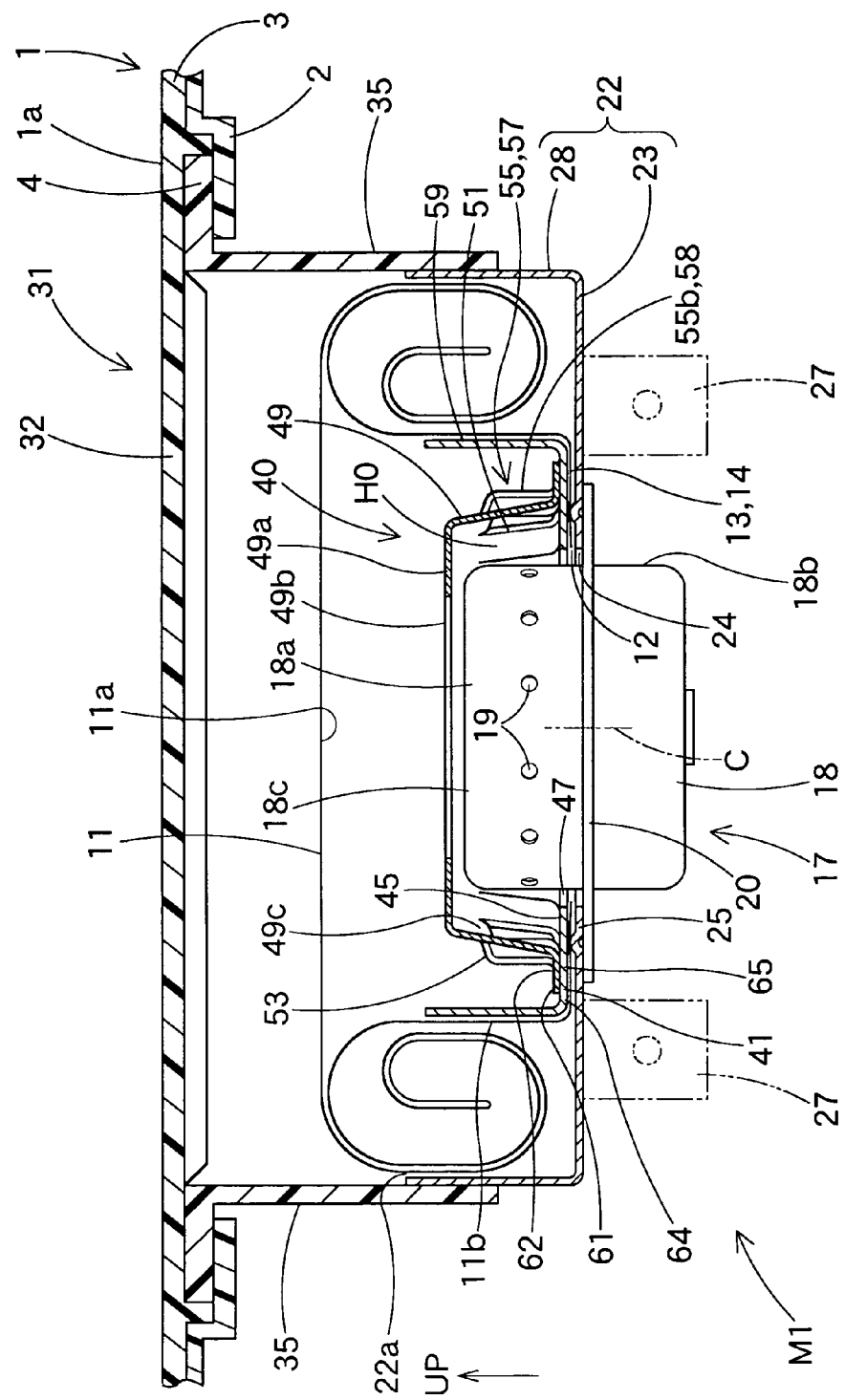
FIG. 2 is a schematic vertical section of the airbag apparatus of FIG. 1, taken along a transverse direction.

An airbag apparatus M1 according to a first embodiment of the invention is mounted on an instrument panel or dashboard as shown in FIGS. 1 and 2, in front of a front passenger's seat. The airbag apparatus M1 is disposed inside of a top plane 1a of the dashboard 1. The airbag apparatus M1 includes a folded-up airbag 11, an inflator 17 for supplying the airbag 11 with inflation gas, a case 22 for housing and holding the airbag 11 and the inflator 17, a retainer 40 for attaching the airbag 11 to the case 22, and an airbag cover 31 for covering the airbag 11.

As shown in FIGS. 1 and 2, the airbag cover 31 is integral with the dashboard 1 in the illustrated embodiment. The dashboard 1 includes a base 2 defining a back side and a cladding layer 3 covering an outer surface of the base 2. The base 2 is made from hard synthetic resin such as polypropylene, and the cladding layer 3 includes a foamed layer of foamable polyurethane or the like and a skin layer. A soft portion 4 made from soft synthetic resin such as thermo-plastic elastomer of polyolefin or the like replaces the base 2 at the location of the airbag cover 31. The airbag cover 31 includes a pair of hinged doors 32 with a thinned breakable portion 34 therearound. The breakable portion 34 is arranged in an H-shape as viewed from above the dashboard 1 so the doors 32 are openable forward and rearward, respectively, around their front or rear ends acting as hinge lines 33.

The airbag cover 31 further includes a joint wall 35 that extend downward from the back side in a generally square cylindrical shape in such a manner as to surround locations of the doors 32. The joint wall 35 includes on its sides confronting each other in the anteroposterior direction a plurality of retaining holes 36 for receiving later-described retaining pawls 29 of the case 22 to retain the case 22.

In the illustrated embodiment, the soft portion 4 forms back sides of the doors 32 of the airbag cover 31, the joint wall 35, and front and rear portions of the joint wall 35 of the back side of the dashboard 1 and in the vicinity of the hinge lines 33 of the doors 32 as shown in FIG. 1.

The case 22 is made of sheet metal into a generally rectangular parallelepiped contour provided with a rectangular opening 22a on top. The case 22 includes a bottom wall 23 having a rectangular plate shape and a side wall 28 extending upwardly and toward the airbag cover 31 in a generally square cylindrical shape from the outer circumference of the bottom wall 23. The bottom wall 23 has a rectangular plate shape elongate in a transverse direction, and includes in its center a generally round insert hole 24 for receiving an upper part 18a of the inflator 17 from lower side toward the airbag cover 31.

A peripheral area of the insert hole 24 of the bottom wall 23 includes four mounting holes 26 for receiving four bolts 42 of the retainer 40 and acts as a mounting seat 25 for attachment of the airbag 11. The bottom wall 23 is further provided in left and right positions of a lower side thereof with brackets 27 for securing the case 22 to vehicle body structure 6. Each of the brackets 27 is provided with a nut 27a into which a bolt 9 that is inserted through a mounting seat 8a of a bracket 8 extending from a reinforcement 7 of the vehicle body structure 6 is fastened. By fastening the bolts 9 into the nuts 27*a*, the case 22, i.e. the airbag apparatus M1 is secured to the vehicle body structure 6.

The side wall 28 of the case 22 is provided at front and rear upper ends thereof with a plurality of retaining pawls 29 turning outwardly and downwardly. As described above, the retaining pawls 29 are inserted into the retaining holes 36 of the joint wall 35 of the airbag cover 31 and held by the joint wall 35.

The inflator 17 is a pyrotechnic inflator that generates gas by combustion of gas generant. The inflator 17 includes a columnar body 18 filled with predetermined gas generant and a flange 20 (FIG. 15) for attachment to the case 22. The flange 20 is projected from the outer circumference of the body 18 in a generally square annular shape (or in a generally square plate shape), and is provided at its four corners with through holes 20*a* for receiving bolts 42 of the retainer 42.

Figure 4:
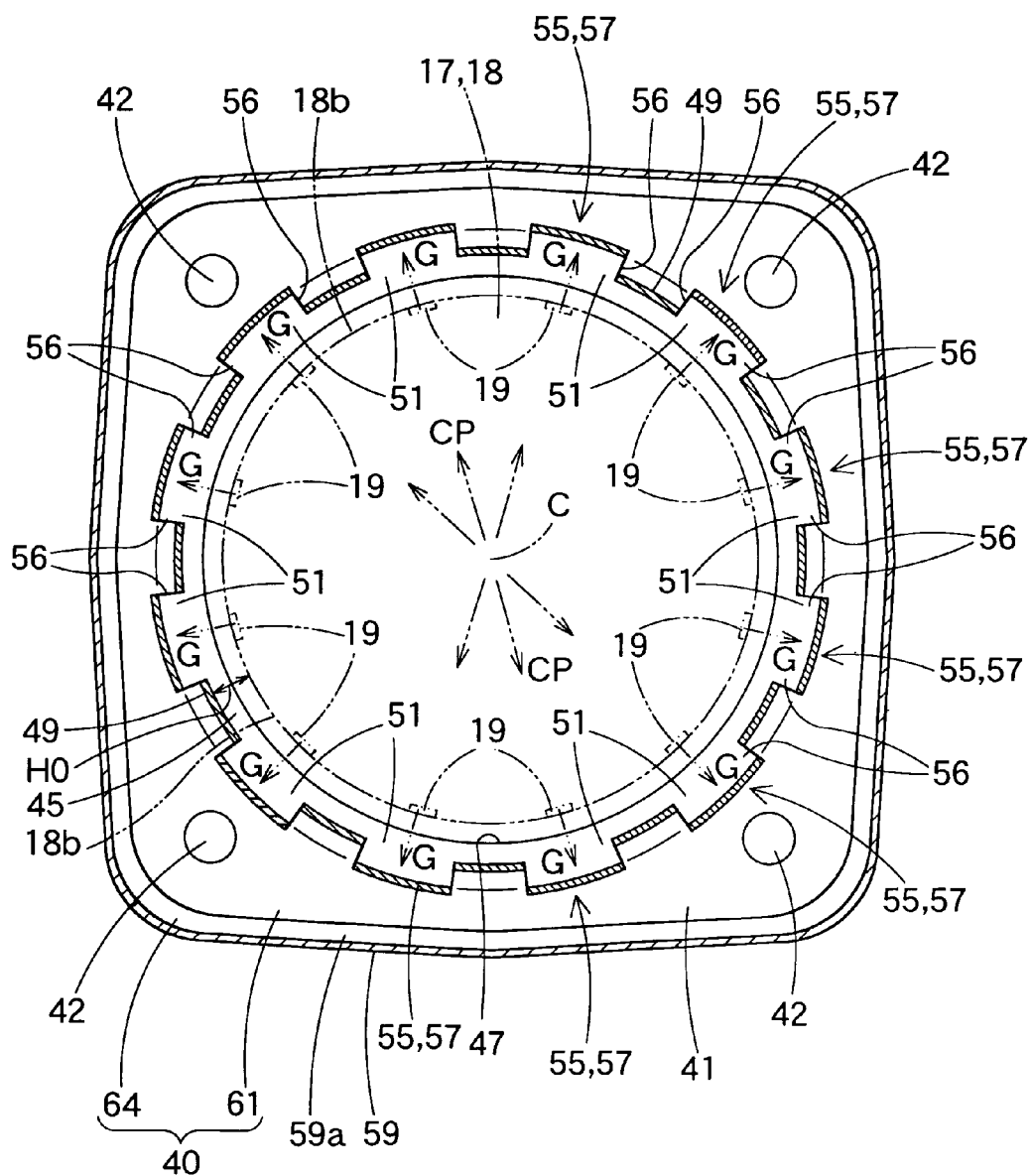
FIG. 4 is a cross section of the retainer of FIG. 3.

The inflator body 18 has a columnar contour that is slightly smaller than an inner diameter of the insert hole 24 of the bottom wall 23 of the case 22, and is provided on and along an outer circumference of the upper part 18*a* above the flange 20 with a plurality of round gas discharge ports 19 for discharging inflation gas G as shown in FIGS. 1, 2 and 4. In this specific embodiment, twelve ports 19 are located radially about an axial center C of the inflator body 18 with equal spaces in between such that the inflator 17 discharges inflation gas G from the ports 19 in directions CP orthogonal to the axis of the body 18, radially about the axial center C. The upper part 18*a* is a portion of the inflator body 18 that is placed inside the airbag 11 as well as in the case 22 from the insert hole 24 of the bottom wall 23.

The airbag 11 is formed by a flexible woven fabric of polyamide, polyester or the like and adapted to inflate into a substantially square conical shape that enlarges toward a passenger's seat. It includes on a lower side of a front area thereof as inflated a round inlet port 12 for introducing inflation gas G. A peripheral area 13 of the inlet port 12 acts as a mounting portion 14 for mounting to the mounting seat 25 disposed on the periphery of the insert hole 24 of the case 22. This annular mounting portion 14 includes four mounting holes 15 that are equally spaced and radially arranged. The inlet port 12 receives the upper part 18*a* of the inflator body 18 while the mounting holes 15 receive bolts 42 of the retainer 40.

As shown in FIGS. 1-4, the retainer 40 is made of sheet metal and includes an annular hold-down portion 41 that is provided with an insert hole 47 generally identical to the insert hole 24 of the case 22 and an outer tubular portion 59 that extends upwardly (i.e., toward the airbag cover 31) from the outer circumference of the hold-down portion 41 in a generally square tubular fashion.

The hold-down portion 41 has a generally square contour and includes bolts 42 that extend downwardly from four corners of the hold-down portion 41 and acts as attaching elements. The hold-down portion 41 attaches the mounting portion 14 of the airbag 11 by holding down the annular mounting portion 14 onto the mounting seat 25 on the periphery of the insert hole 24 on an upper side of the bottom wall 23 of the case 22 while the bolts 42 are fastened into nuts 43 (FIG. 1).

The bolts 42 attach the airbag 11 to the upper side of the mounting seat 25 of the bottom wall 23 of the case 22 as well as attach the inflator 17 to a lower side of the bottom wall 23 when passed through the mounting holes 15 of the airbag 11, mounting holes 26 of the bottom wall 23 of the case 22, through holes 20*a* of the flange 20 of the inflator 17 and then fastened into the nuts 43.

In the first embodiment, the retainer 40 further includes a cover wall 49, a deflector 55 acting as a catch 57 as well and a restriction wall 53.

As shown in FIGS. 1, 2, 4 and 5, the cover wall 49 is formed into such a tubular contour as disposed around and the outer circumference 18*b* of the inflator body 18 set in the case 22 with a clearance H0 to the outer circumference 18*b* and as extends upwardly from the vicinity of the inner circumference of the insert hole 47 of the hold-down portion 41. The cover wall 49 includes a plurality of outlet ports 51 that release inflation gases G exited the gas discharge ports 19 of the inflator body 18 radially about the inflator body 18 and along the directions CP orthogonal to the axial center C of the inflator body 18. In the first embodiment, the outlet ports 51 are arranged intermittently along the circumference of the inflator body 18 and each of them has a rectangular shape. Twelve outlet ports 51 are formed to be equal in number to the gas discharge ports 19 at the same level from the bottom wall 23 of the case 22 as the discharge ports 19 and on extensions of directions that inflation gases G exit from the discharge ports 19. In the first embodiment, especially, since the inflator body 18 is configured into a columnar shape to discharge inflation gas G radially about the axial center C of the body 18, each of the outlet ports 51 is located on a radially extending direction from the axial center C of the inflator body 18 at each of the gas discharge ports 19. Furthermore, each of the outlet ports 51 is configured to have a greater opening area than that of each of the gas discharge ports 19 in proportion to the clearance H0 between the inflator body 18 and cover wall 49. That is, the outlet port 51 is configured small if the clearance H0 is small while configured large if the clearance H0 is large such that an inflation gas G exited the gas discharge port 19 passes through the outlet port 51 and avoids to hit the periphery of the port 51 as much as possible even if the gas G is discharged conically with a certain spray angle.

The cover wall 49 is provided over an entire upper edge with annular eaves 49*a* that project inward. The eaves 49*a* are located above the top plane 18*c* of the inflator body 18 and an inner surface 49*b* (FIGS. 1 and 3) thereof is arranged at an inward position relative to a position generally above the outer circumference 18*b* of the inflator body 18 as the inflator 17 and retainer 40 are attached to the case 22.

Figure 5:
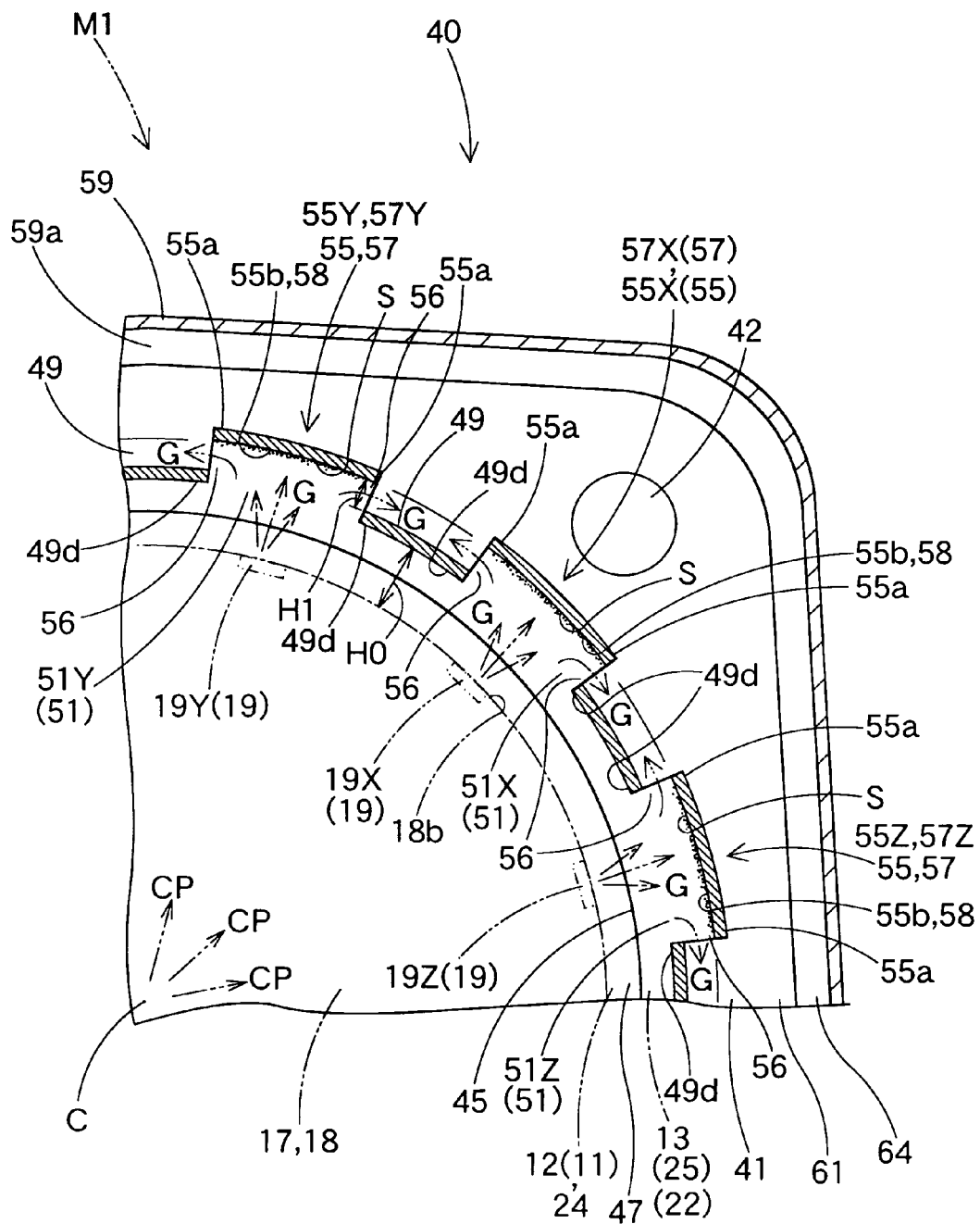
FIG. 5 is a partial enlarged cross section of the retainer of FIG. 3.
Figure 6:
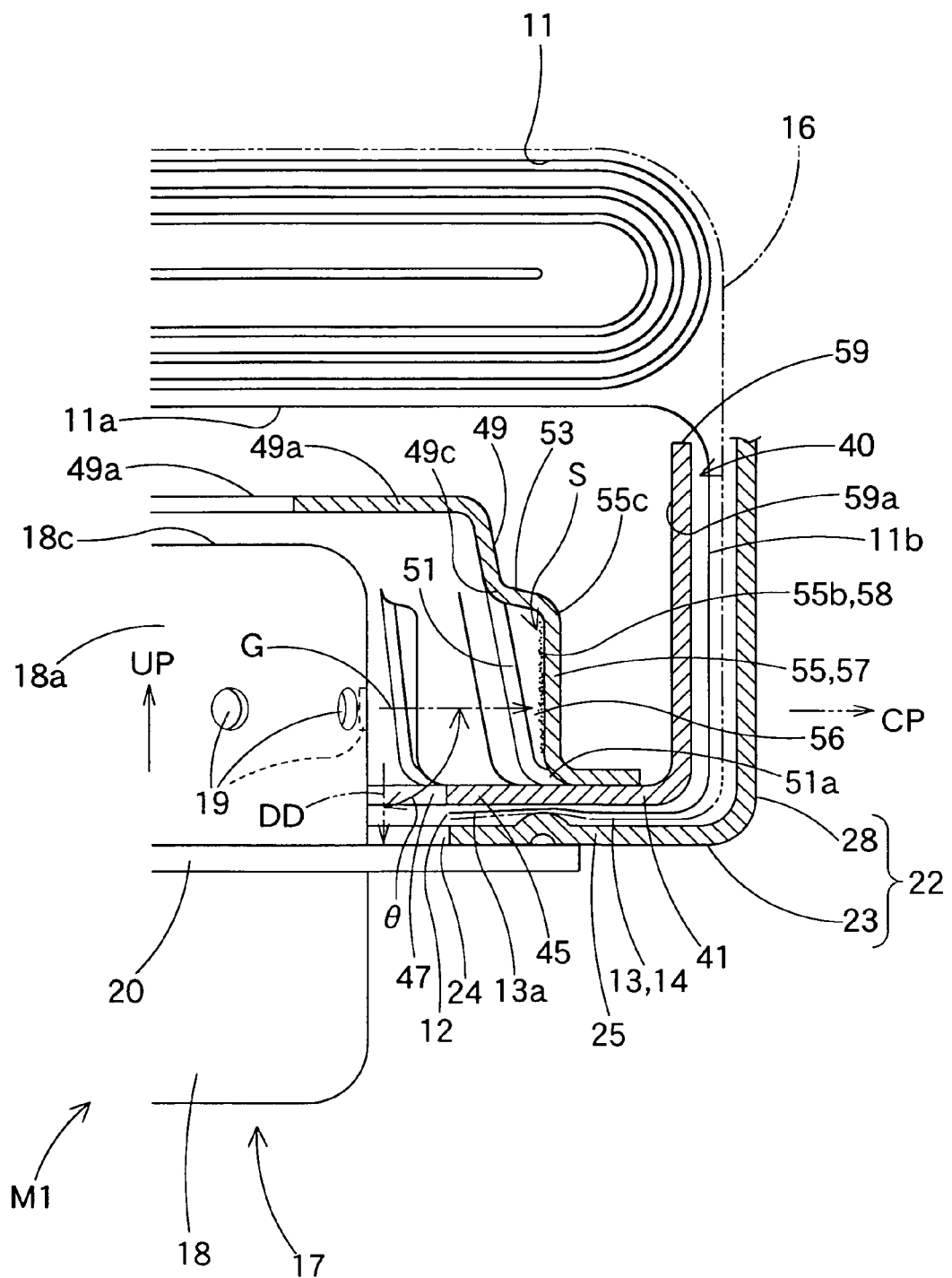
FIG. 6 is a partial enlarged vertical section of the airbag apparatus of FIG. 1.

Each of the deflectors 55 is formed to oppose each of the outlet ports 51 proximate the outlet port 51 above the hold-down portion 41 and on the outside of the cover wall 49 so as to deflect inflation gases G exited the outlet ports 51 away from the outlet ports 51 and within such an angle θ (FIG. 6) as ranges from the directions CP orthogonal to the axial center C of the inflator body 18, i.e. directions parallel to the hold-down portion 41, the periphery 13 of the inlet port 12 of the airbag 11, or the mounting seat 25 of the case 22, which includes a radially extending direction from and a circumferential direction about the axial center C of the inflator body 18, to a downward direction DD extending toward the hold-down portion 41. Each of the catches 57 is so formed proximate the outlet port 51 above the hold-down portion 41 and on the outside of the cover wall 49 as shown in FIGS. 5 and 6. The catches 57 receive and capture residual particles S contained in inflation gases G when the gases G deflected by the deflectors 55 hit the catches 57.

In the first embodiment, moreover, the deflectors 55 concurrently act as the catches 57 as well. That is, each of the deflectors 55 is formed into a vertical plate on a radially extending position about the axial center C of the inflator body 18 passing through the outlet port 51 as shown in FIGS. 4-6. With a clearance H1 (FIG. 5) between the cover wall 49 and both ends 55*a* of each of the deflectors 55 in the circumferential direction of the inflator body 18, each of the deflectors 55 has at both of the ends 55a exit holes 56 that release inflation gas G toward opposite directions along the circumferential direction of the inflator body 18.

Further, an opposing plane 55b of the deflector 55 that opposes each of the outlet ports 51 acts as a catching plane 58 of the catch 57 that catches residual particles S. More specifically, when an inflation gas G passed through the outlet port 51 of the cover wall 49 hits the deflector 55 and bifurcates into 180-degree opposite directions for exit from the exit holes 56 at the ends 55a of the deflector 55, the residual particles S, which is tacky and greater in weight than the gas G, adhere to the opposing plane 55b of the deflector 55 acting as the catching plane 58 as well.

The inflation gas G passed through the outlet port 51 exits from the exit holes 56 along the circumferential direction of the inflator body 18. That is, the inflation gas G exits from the exit holes 56 in a direction away from the outlet port 51 and extending along the direction CP orthogonal to the axial center C of the inflator body 18.

The restriction wall 53 is formed to connect an upper hem 49c of each of the outlet ports 51 in the cover wall 49 and an upper end 55c of each of the deflectors 55 as shown in FIG. 6. The restriction wall 53 bans an upward outflow of inflation gas G.

Figure 3:
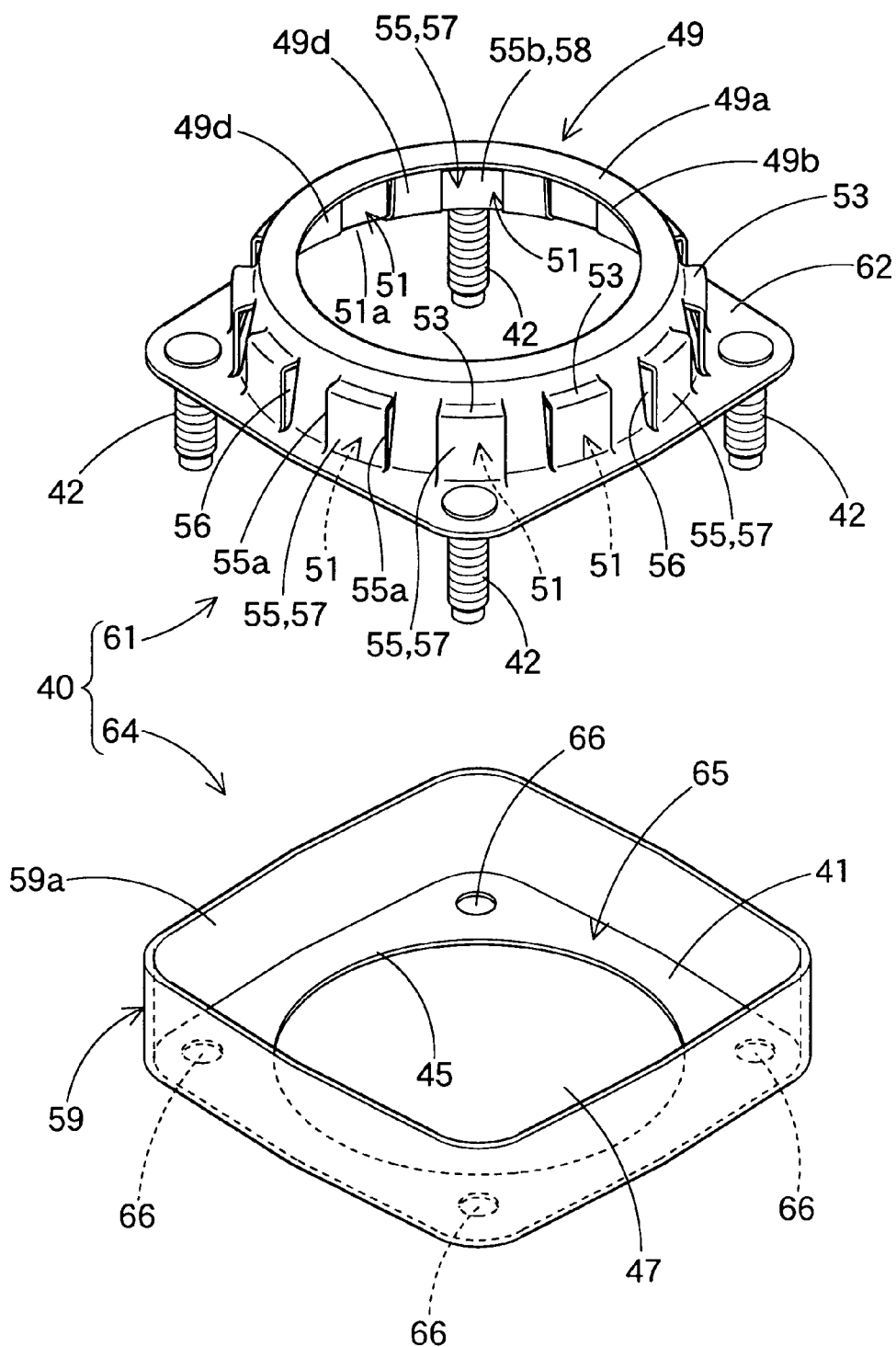
FIG. 3 is a perspective exploded view of a retainer of the first embodiment.

As shown in FIG. 3, the retainer 40 in the first embodiment is comprised of an upper part 61 and a lower part 64 both of which are made of sheet metal. The upper part 61 constitutes an upper side of the hold-down portion 41 including the cover wall 49 and deflectors 55 while the lower part 64 constitutes a lower side of the hold-down portion 41.

The upper part 61 includes a square annular attachment ring 62 at an inner edge of which the cover wall 49, restriction walls 53 and deflectors 55 are arranged. The attachment ring 62 includes at four corners thereof bolts 42 extending downward and acting as attaching elements for attaching the retainer 40 to the periphery of the insert hole 24 of the case 22. The lower part 64 includes a square annular hold-down ring 65 provided with a round insert hole 47 with the same inner diameter as the insert hole 24 of the case 22. The hold-down ring 65 includes at four corners thereof through holes 66 for receiving the bolts 42 of the upper part 61.

The lower part 64 includes the outer tubular portion 59 described above. The outer tubular portion 59 is continuous with the entire outer circumference of the hold-down ring 65 and located outside of the attachment ring 62 of the upper part 61. The outer tubular portion 59 is greater in height than the top of the cover wall 49. An inner peripheral region of the hold-down ring 65 around the insert hole 47 acts as a flange 45 that extends up to the inner edge of the insert hole 24 of the case 22 and is located below the outlet ports 51 such that it covers a part 13a of the periphery 13 of the gas inlet port 12 of the airbag 11 as shown in FIG. 6.

The deflectors 55 or catches 57 together with the restriction walls 53 are formed by such pressing work as to push out portions of the deflectors 55 after slitting locations of the exit holes 56 on the cover wall 49.

Mounting of the airbag apparatus M1 on the vehicle is now described. Firstly, the retainer 40 is assembled by placing the attachment ring 62 of the upper part 61 onto the hold-down ring 65 of the lower part 64 while inserting the bolts 42 into corresponding through holes 66. The retainer 40 is placed inside the airbag 11 such that the bolts 42 project from the mounting holes 15. Then the airbag 11 is folded up and is wrapped by a breakable wrapping sheet 16 (FIG. 1) to keep the folded-up configuration.

Subsequently, the folded-up airbag 11 is located on the bottom wall 23 of the case 22 from the opening 22a by inserting the bolts 42 into the mounting holes 26 from above. Then, the upper part 18a of the inflator body 18 is set in the insert holes 24, 47 and the gas inlet port 12 from lower side such that the bolts 42 projecting downward from the bottom wall 23 are inserted into the through holes 20a of the flange 20 of the inflator 17. If the bolts 42 are then fastened into the nuts 43, the inflator 17 is attached to the mounting seat 25 of the bottom wall 23 of the case 22 while the hold-down portion 41 of the retainer 40 holds down the periphery 13 of the gas inlet port 12 of the airbag 11 onto the bottom wall 23 and attaches the periphery 13 to the mounting seat 25 of the bottom wall 23 of the case 22.

Thereafter, the side wall 28 of the case 22 is inserted within the joint wall 35 of the airbag cover 31 in the dashboard 1 mounted on the vehicle, and the retaining pawls 29 of the case 22 are inserted into the retaining holes 36 of the joint wall 35 such that the retaining pawls 29 are retained by the joint wall 35. If the bolts 9 are further fastened into the nuts 27a of the brackets 27 through the mounting seats 8a, the airbag apparatus M1 is mounted on the vehicle.

In operation after mounting the airbag apparatus M1 on the vehicle, inflation gases G exit the gas discharge ports 19b of the inflator 17 along the directions CP orthogonal to the axial center C of the inflator body 18 as shown in FIGS. 5 and 6. The gases G reach the cover wall 49 of the retainer 40 and pass through the outlet ports 51 generally along the directions CP orthogonal to the axis of the inflator body 18 and radially about the inflator body 18. Then the gases G hit the catches 57 while being deflected by the deflectors 55. At this time residual particles S contained in the gases G adhere to and get captured by the catches 57 while cleaned-up gases G get deflected by the catches 57 and flow into and inflate the airbag 11. The airbag 11 breaks the wrapping sheet 16 while inflating and tears the breakable portion 34 of the airbag cover 31 and opens the doors 32 as indicated by double-dashed lines in FIG. 1. Then the airbag 11 deploys from an opening provided by the opening of the doors 32.

As shown in FIG. 5, in the airbag apparatus M1, the outlet ports 51 are formed intermittently along the circumference of the inflator body 18 such that inflation gases G exited the discharge ports 19 of the inflator body 18 outflow generally in the directions CP orthogonal to the axis of the inflator body 18 and radially about the inflator body 18. Further, each of the deflectors 55 is formed to correspond to one specific outlet port 51. With this configuration, an inflation gas G exited a specific outlet port 51X hits only a corresponding deflector 55X or catch 57X that is located proximate the outlet port 51X on the outside of the cover wall 49. Accordingly, the gas G exited the outlet port 51X keeps hitting the corresponding catch 57X. Other gases G exited adjoining outlet ports 51Y and 51Z hit the catch 57X corresponding to the specific outlet port 51X only after they hit adjoining deflectors 55Y and 55Z and adjoining catches 57Y and 57Z that correspond to the adjoining outlet ports 51Y and 51Z. The other gases G at this point do not have such high flow speed as to thrust back the gas G from the catch 57X and hit the catch 57X. Consequently, a gas G exited a certain outlet port 51 only hits a specific catch 57, so that residual particles S once caught by the specific catch 57 are prevented from being blown off by other gases from different directions. Accordingly, each of the catches 57 captures more residual particles S in an accumulating manner.

In the first embodiment, moreover, each of the deflectors 55 deflects an inflation gas G exited a specific outlet port 51 away from the specific outlet port 51 and to the range of angle θ

(FIG. 6) from the direction CP orthogonal to the axial center C of the inflator body 18 to a downward direction DD extending toward the hold-down portion 41. In other words, each of the deflectors 55 deflects the gas G away from upward. Accordingly, inflation gases G containing residual particles S are prevented from flowing upwardly, i.e. toward the airbag 11 directly. To paraphrase, the gases G never fail to pass through the locations of the catches 57 before heading for the interior of the airbag 11, so that residual particles S are securely captured by the catches 57 before the gases G are fed to the airbag 11.

In the airbag apparatus M1 according to the first embodiment, the cover wall 49, the deflectors 55 and the catches 57 formed on the retainer 40 for attaching the airbag 11 to the case 22 help capture residual particles S contained in inflation gases G securely and help prevent the residual particles S from being blown off after once caught. Therefore, the airbag apparatus M1 supplies the airbag 11 with inflation gases G containing reduced residual particles S, and reduces damages to the airbag 11 that the airbag 11 may otherwise sustain because of the particles S.

In the first embodiment, moreover, each of the outlet ports 51 is located on an extension of the discharging direction of a gas G exiting one specific discharge port 19 corresponding to the outlet port 51. Especially in this specific embodiment, as shown in FIG. 5, each of the outlet ports 51 is located on a radially extending direction from the axial center C of the inflator body 18 that passes through a specific discharge port 19. With this configuration, even with the clearance H0 between the cover wall 49 and the outer circumference of the inflator body 18, an inflation gas G exited one specific gas discharge port 19X flows radially about the axial center C of the inflator body 18 and immediately passes through the cover wall 49 via the corresponding outlet port 51X, and then passes through the location of the corresponding deflector 55X and corresponding catch 57. That is, the gas G exited the specific discharge port 19X is securely prevented from heading for the adjoining outlet ports 51Y or 51Z. Additionally, even with the clearance H0, inflation gases G exited adjoining discharge ports 19Y and 19Z of the inflator body 18 are blocked by an area 49d of the cover wall 49 on the periphery of the outlet port 51X, and therefore will not directly hit residual particles S caught on the catch 57X corresponding to the specific outlet port 51X. That is, the gas G exited the specific outlet port 51X keeps on hitting the corresponding catch 57 via a fixed channel, and gases from other directions, i.e. gases exited discharge ports 19Y and 19Z adjoining the specific discharge port 19X are prevented from directly hitting the residual particles S caught on the catch 57X corresponding to the outlet port 51X.

As a result, each of the gases G exited the outlet ports 51 is so stabilized as to pass through the fixed channel to hit the corresponding catch 57 such that each of the catches 57 captures residual particles S in a steady manner. Hence the catches 57 are enabled to capture more residual particles S, so that inflation gases G with further reduced particles S are supplied into the airbag 11.

As described above, the operation of a gas that exits one outlet port 51 and reaches only the corresponding catch 57 may be improved by configuring an opening area of each of the gas discharge ports 19 smaller than that of the corresponding outlet port 51 in proportion to the clearance H0 between the inflator body 18 and the cover wall 49 and reducing a spray angle of inflation gas G from the gas discharge port 19.

In the first embodiment, furthermore, the cover wall 49 includes the restriction walls 53 that connect the upper hem 49c of each of the outlet ports 51 and the upper end 55c of each of the deflectors 55 and prevent an upward outflow of inflation gas G (FIG. 5). The restriction walls 53 thus prevent gases G from heading for the airbag 11 without hitting the deflectors 55 after passing through the outlet ports 51, thereby preventing the gases G from flowing into the airbag 11 as contains residual particles S and inhibiting damages to the airbag 11 that the airbag 11 may otherwise sustain due to the particles S.

In the first embodiment, additionally, each of the deflectors 55 concurrently acts as the catch 57. Specifically, each of the deflectors 55 is formed to stand vertically on a radially extending position about the axial center C of the inflator body 18 at each of the outlet ports 51, and is provided, between both ends 55a thereof in the circumferential direction of the inflator body 18 and the cover wall 49, with clearances H1 that act as exit holes 56 that release an inflation gas G toward opposite directions along the circumferential direction of the inflator body 18 after the gas G hit the deflector 55. The plane 55b of each of the deflectors 55 that opposes the outlet port 51 serves as the catching plane 58 of the catch 57 that captures residual particles S of the gas G when the gas G exits from the exit holes 56.

With this configuration, an inflation gas G passed the outlet port 51 of the cover wall 49 and hit the deflector 55 bifurcates into opposite directions along the circumference of the inflator body 18 for exit from the exit holes 56 formed on the both ends of the deflectors 55. At this time, residual particles S contained in the gas G adhere to the opposing planes 55b of the deflectors 55, as they are tacky and greater in weight than the gas G, and subsequent particles S adhere to the particles S which had adhered to the catch 57 and thus accumulate on the catch 57. As a result, cleaned-up gas G is fed to the airbag 11. That is, the deflectors 55 concurrently act as the catches 57 by capturing residual particles S with the planes 55b thereof opposing the outlet ports 51.

Besides, since the inflation gas G bifurcates into opposite directions along the circumference of the inflator body 18 upon hitting the opposing plane 55b acting as the catching plane 58, the gas G loses some velocity before heading for the airbag 11, so that the airbag 11 is prevented from abruptly and straightly projecting toward a vehicle occupant, i.e. a passenger seated in the front passenger's seat, in this specific embodiment, thereby deploying softly.

Moreover, the retainer 40 of the first embodiment includes the outer tubular portion 59 having a square tubular contour that is continuous with an entire outer circumference of the hold-down portion 41 and is configured greater in height than the top or the eaves 49a of the cover wall 49. The outer tubular portion 59 guides inflation gases G upwardly and blocks the gases S from a region 11b of the airbag 11 surrounding the retainer 40 (FIGS. 2 and 6) even though the gases G flow circumferentially about the inflator body 18 or flow radially about the axis C of the inflator body 18 on the hold-down portion 41 after passing the deflectors 55 or catches 57. Accordingly, the region 11b of the airbag 11 is protected from the gas G. The outer tubular portion 59 also captures residual particles S of the gas G that the catches 57 failed to capture by its inner surface 59a, thereby conducing to feed further cleaned-up gas G to the airbag 11.

Furthermore, as shown in FIG. 6, the retainer 40 of the first embodiment includes the flange 45 that extends up to the vicinity of the inner edge of the insert hole 24 of the case 22 at a lower side of the outlet ports 51. The flange 45 covers the periphery 13 of the gas inlet port 12 of the airbag 1 located below the outlet ports 51 and protects the periphery 13 from hot inflation gases G discharged from the discharge ports 19 of the inflator body 18.

In addition, as shown in FIGS. 1 and 3, the retainer 40 of the first embodiment is comprised of the upper part 61 and the lower part 64. The upper part 61 constitutes the upper part of the hold-down portion 41 including the cover wall 49 and deflectors 55, and includes at its outermost region the annular attachment ring 62 provided with a plurality of bolts 42 for attaching the whole retainer 40 to the mounting seat 25 of the case 22. The lower part 64 constitutes the lower part of the hold-down portion 41 and includes the flange 45, the annular hold-down ring 65 provided with through holes 66 for receiving the bolts 42, and the outer tubular portion 59. The outer tubular portion 59 is formed continuous with an entire outer circumference of the hold-down portion 41 outside of the attachment ring 62 of the upper part 61 and is greater in height than the top of the cover wall 49.

This configuration facilitates the manufacturing of the retainer 40 including the flange 45 and outer tubular portion 59 that protect regions of the airbag 11 disposed inside of the cover wall 49 and outside of the hold-down portion 41, i.e. the region 13a of the periphery 13 of the inlet port 12 and the region 11b. Specifically, the lower part 64 has only to form the lower side of the retainer 40, and does not have to be provided with the cover wall 49 or deflectors 55. Therefore, it is easily manufactured by applying pressing work to a sheet metal, into such contour as has a U-shaped section. The upper part 61 has the cover wall 49 provided with the outlet ports 51 and deflectors 55 and the attachment ring 62 provided with the bolts 42. It will be difficult by pressing work to manufacture such a single-entity retainer as includes the outlet ports 51, the flange 45 extending inward beyond the lower edges 51a of the outlet ports 51, together with the attachment ring 62 that is disposed up to the outer peripheral edge and provided with the bolts 42. However, with the configuration of this specific embodiment, the upper part 61 does not have to be provided with the flange 45 since the flange 45 is formed on the lower part 64.

Therefore, if configured like this embodiment, the retainer 40 is manufactured easily even though it includes the flange 45 for protecting the portion of the airbag 11 inside the cover wall 49 (i.e., the region 13a of the periphery 13 of the inlet port 12) and the outer tubular portion 59 for protecting the other portion of the airbag 11 outside the hold-down portion 41 (i.e., the region 11b). Additionally, the upper part 61 and lower part 64 are assembled together for attachment to the mounting seat 25 of the case 22 simply by inserting the bolts or attaching elements 42 into the through holes 66 of the lower part 64 and then through the mounting seat 25. Accordingly, this configuration does not require separate means for assembling the upper part 61 and lower part 64.

Although the deflectors 55 of the retainer 40 concurrently act as the catches 57 in the first embodiment, the deflectors 55 and the catches 57 may be formed separately as a following second embodiment.

Figure 7:
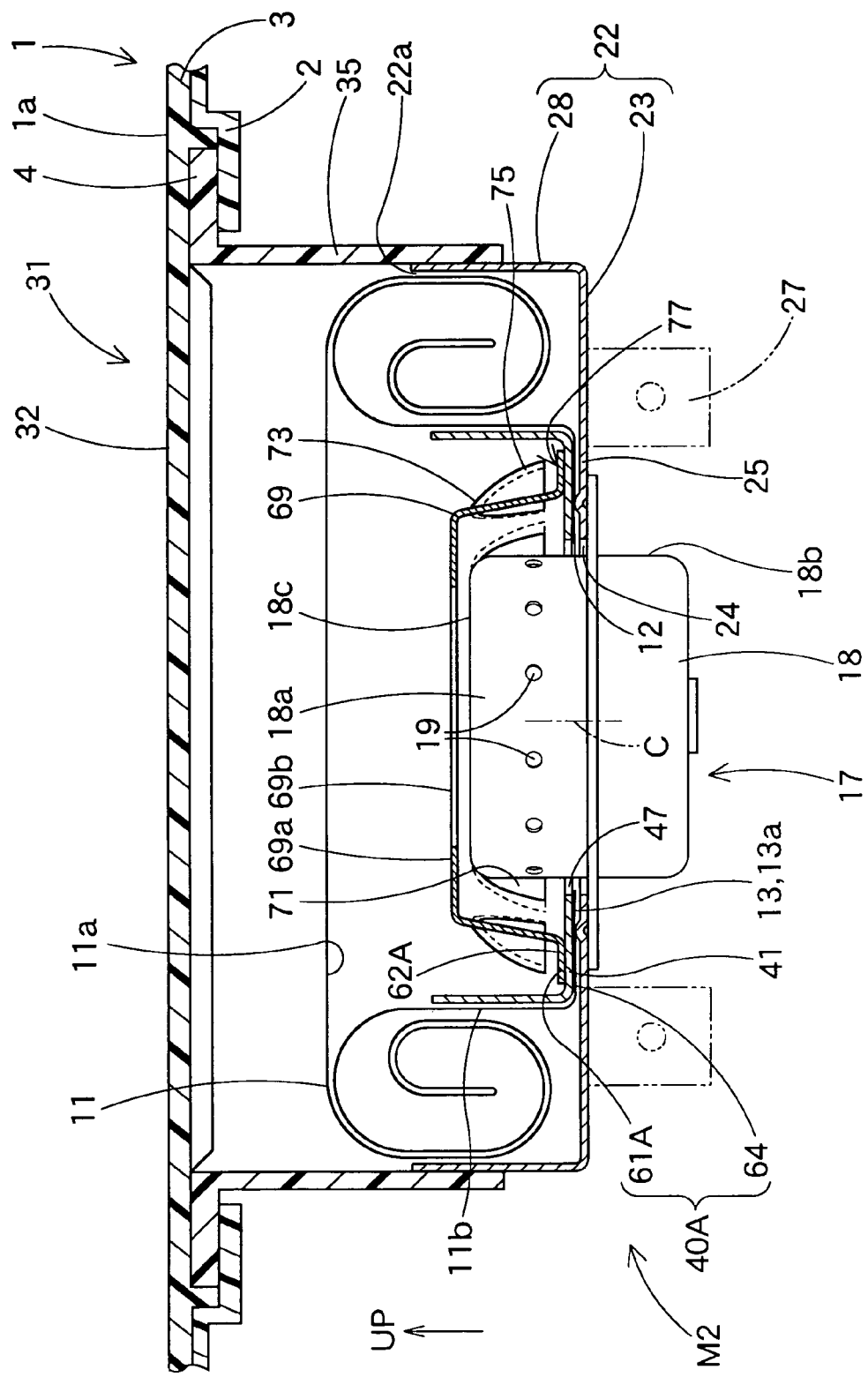
FIG. 7 is a schematic vertical section of an airbag apparatus according to the second embodiment of the invention taken along a transverse direction.
Figure 8:
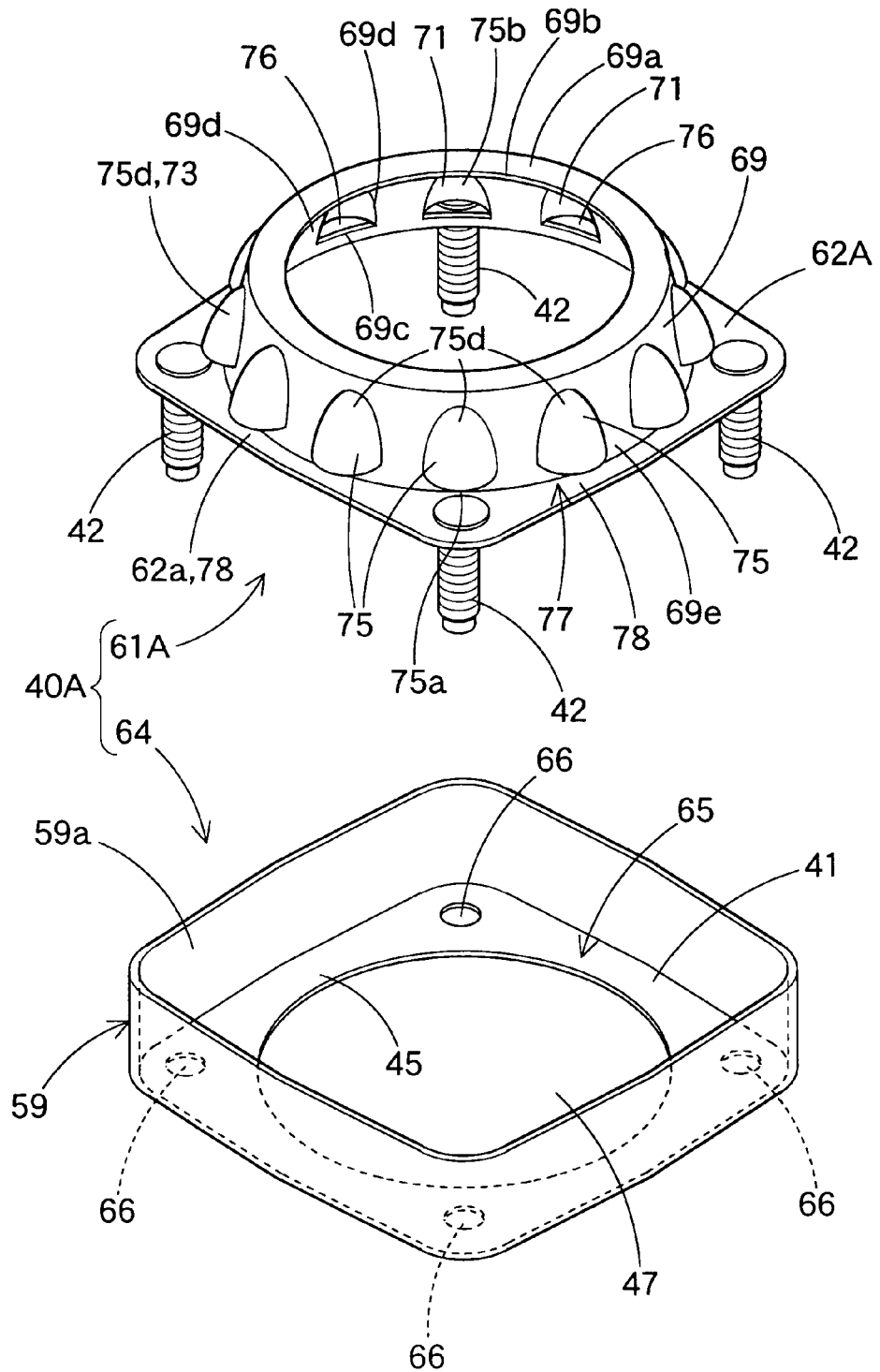
FIG. 8 is a perspective exploded view of a retainer of the second embodiment.

An airbag apparatus M2 according to the second embodiment is now described in accordance with FIGS. 7 to 11. A retainer 40A of the airbag apparatus M2 differs from the first embodiment only in the configuration of an attachment ring 62A of an upper part 61A except the bolts 42 (FIGS. 7 and 8). Since other components of the retainer 40A have common configurations to the first embodiment, descriptions of those components will be omitted by using common reference numerals.

Besides, the airbag 11, inflator 17, case 22 and airbag cover 31 of the second embodiment have common configurations to the first embodiment as well, and therefore, descriptions of these members will be omitted by using common reference numerals.

Figure 9:
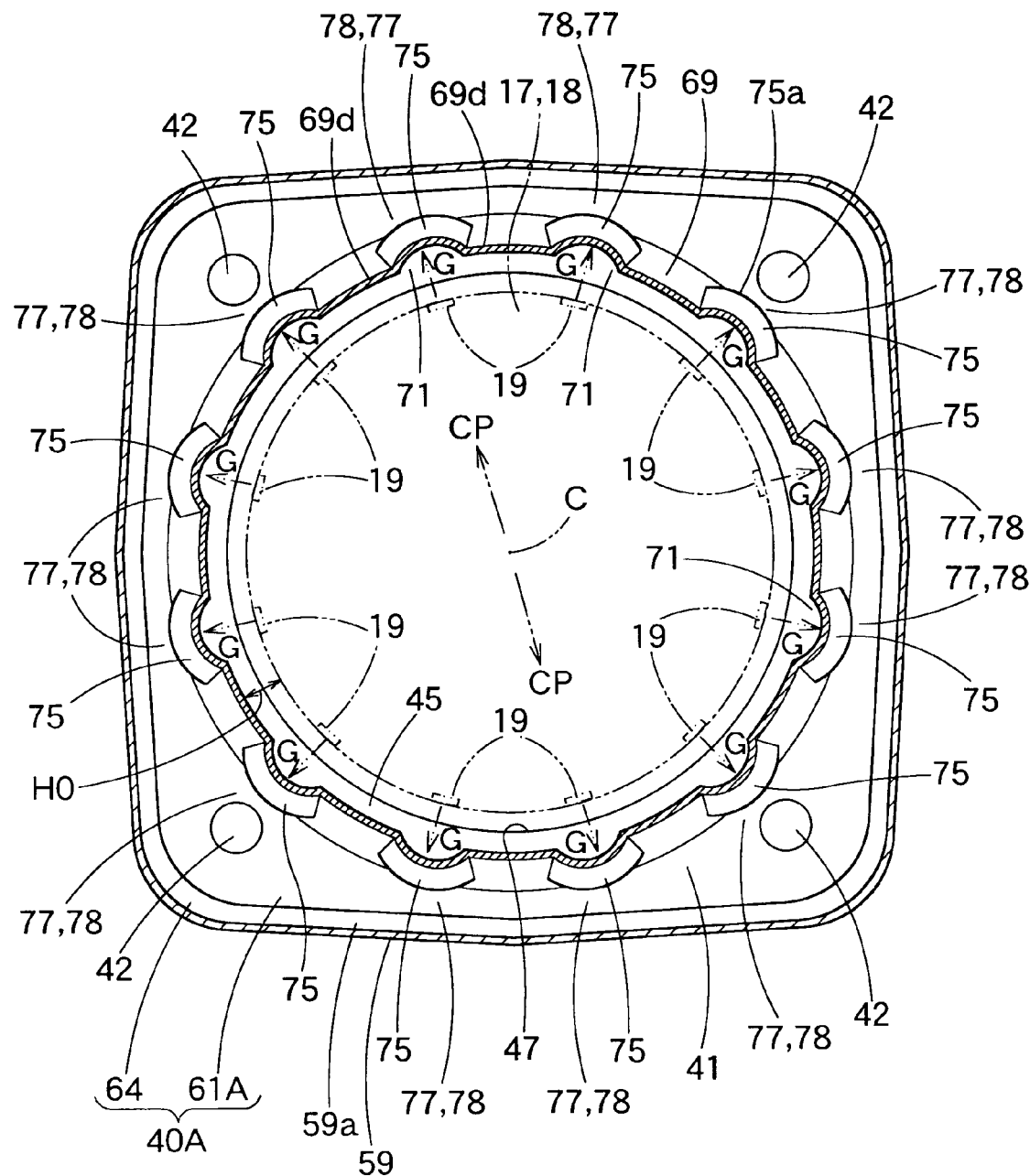
FIG. 9 is a cross section of the retainer of FIG. 8.
Figure 10:
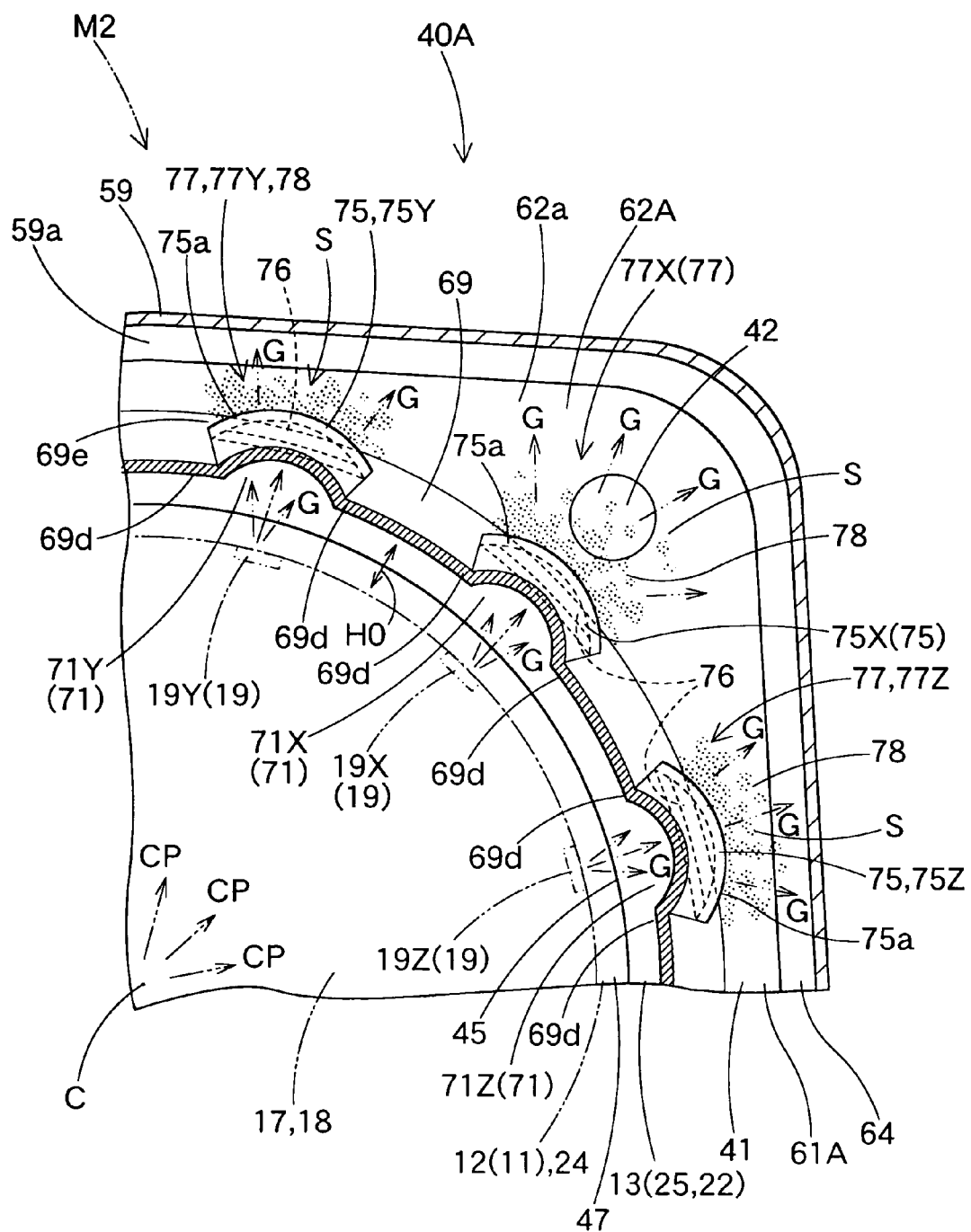
FIG. 10 is a partial enlarged cross section of the retainer of FIG. 8.
Figure 11:
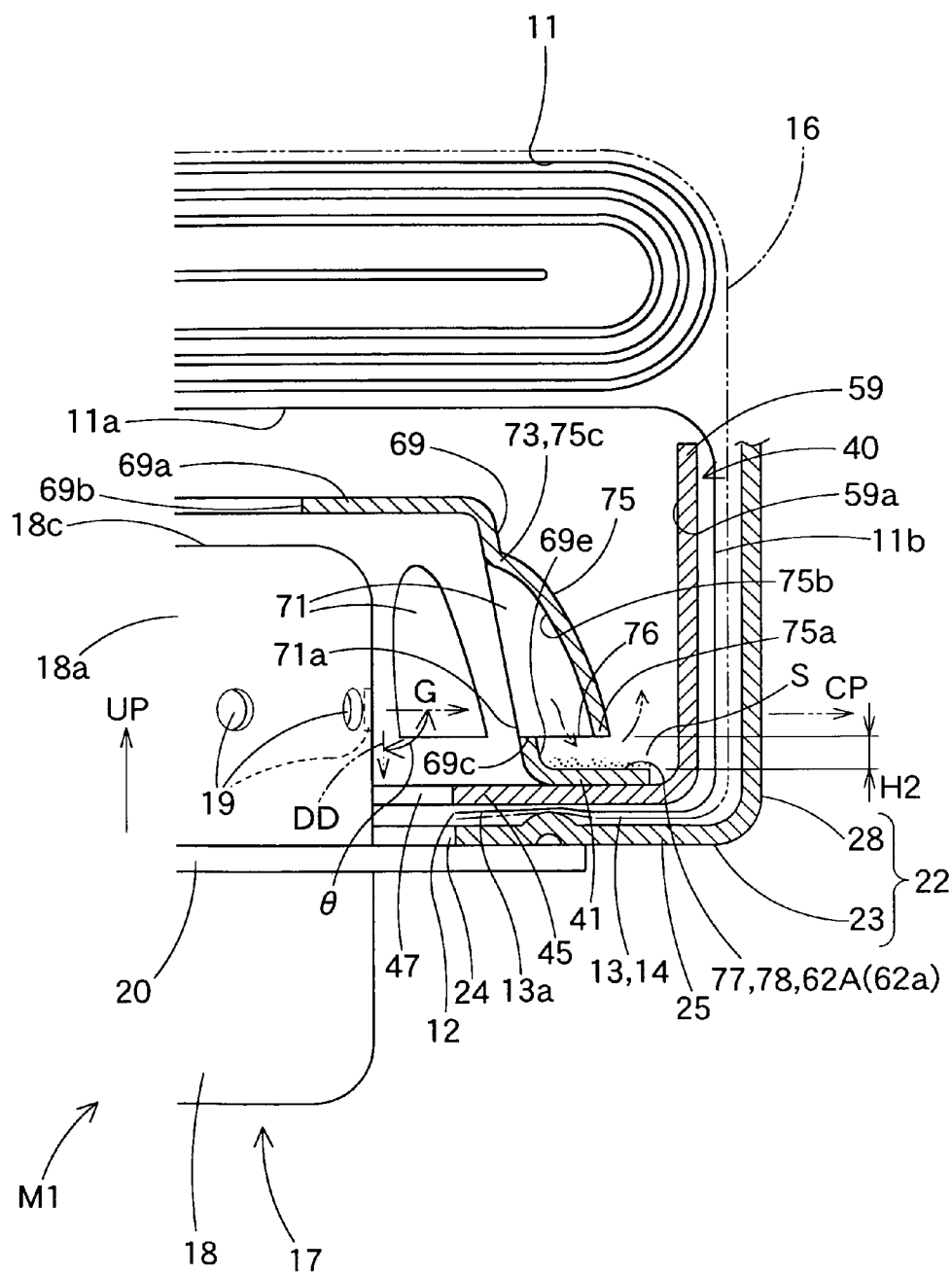
FIG. 11 is a partial enlarged vertical section of the airbag apparatus of FIG. 7.

In the second embodiment, too, a cover wall 69 of the retainer 40A is formed into such a tubular contour as disposed around and the outer circumference 18b of the inflator body 18 set in the case 22 with the clearance H0 to the outer circumference 18b (FIGS. 9 and 10). As shown in FIGS. 9 to 11, the cover wall 69 includes a plurality of outlet ports 71 that release inflation gases G exited the gas discharge ports 19 of the inflator body 18 radially about the inflator body 18 and generally along the directions CP orthogonal to the axial center C of the inflator body 18 and extends upwardly from the hold-down portion 41.

In the second embodiment, too, the cover wall 69 includes twelve outlet ports 71 corresponding to the number of the gas discharge ports 19 of the inflator body 18. The outlet ports 71 are arranged intermittently on the cover wall 69 along the circumference of the inflator body 18, at the same level from the bottom wall 23 of the case 22 as the discharge ports 19 and on radially extending directions from the axial center C of the inflator body 18 passing through the gas discharge ports 19. However, unlike the first embodiment, each of the outlet ports 71 of the second embodiment has such a contour as an isosceles triangle that enlarges toward the bottom.

As best shown in FIG. 8, the cover wall 69 is provided over an entire upper edge with annular eaves 69a that project inward as the first embodiment. The eaves 69a are located above the top plane 18c of the inflator body 18 and an inner surface 69b (FIGS. 7 and 11) thereof is arranged at an inward position relative to a position generally above the outer circumference 18b of the inflator body 18 as the inflator 17 and retainer 40A are attached to the case 22.

The deflectors 75 are formed to oppose the outlet ports 71 above the hold-down portion 41 and on the outside of the cover wall 69 as shown in FIG. 11 so inflation gases G exited the outlet ports 71 flow downward toward the hold-down portion 41. Each of the deflectors 75 includes an exit hole 76 at the lower edge 75a located above the hold-down portion 41 by a clearance H2 for releasing the gas G hit the deflector 75 along the hold-down portion 41 and radially about the axial center C of the inflator body 18. Catches 77 are located on a top plane 62a of the hold-down portion 41 in the vicinity of each corresponding outlet port 71. Regions of the top plane 62a opposing the exit holes 76 in the vicinity of the cover wall 69 act as catching planes 78 of the catches 77 for capturing residual particles S. More specifically, regions of the top plane 62a of the attachment ring 62 opposing the exit holes 76 outside of the cover wall 69 (FIGS. 10 and 11) constitute the catches 77 of the second embodiment.

In the second embodiment, each of the deflectors 75 is formed by slitting a location of the lower edge 71a of the outlet port 71 on the cover wall 69 and pushing out a region above the lower edge 71a by pressing work. For this reason, each of the deflectors 75 is formed into such a half circular-conical tapered pipe that its plane 75b opposing the outlet port 71 bulges in an arcuate fashion about the axial center C of the inflator body 18 in a horizontal section of the inflator body 18 and draws apart from the body 18 as it goes downward as shown in FIG. 10. With this configuration, an upper end 75c of each of the deflectors 75, which continues from the cover wall 69, constitutes a restriction wall 73 that checks an upward outflow of the inflation gas G (FIG. 11).

As shown in FIG. 10, each of the exit holes 76 is formed like a generally crescent moon and is located separate from the top plane 62a of the attachment ring 62 and outside of a lower edge 69c of a periphery of the outlet port 71 in an outer circumference 69e of the cover wall 69 (FIG. 11).

In operation of the airbag apparatus M2 including the retainer 40A configured as above, inflation gases G exited the discharge ports 19 of the inflator 17 reach and pass through the outlet ports 71 of the cover wall 69 as shown in FIGS. 10 and 11. Subsequently the gases G hit the deflectors 75 provided corresponding to the outlet ports 71 and are deflected downward DD (FIG. 11) toward the hold-down portion 41 and bump the catching planes 78 of the catches 77 formed on the top plane 62*a* of the hold-down portion 41. Then the gases G flow radially outwardly about the axial center C of the inflator body 18 via the exit holes 76 formed between the lower edges 75*a* of the deflectors 75 and the hold-down portion 41 or the catches 77. When the gases G hit the catching planes 78 of the catches 77 and turn outwardly, tacky and heavy residual particles S adhere to the catching planes 78, and subsequent particles S adhere to the particles S which had adhered to the catches 77 and thus accumulate on the catches 77. As a result, cleaned-up gas G is fed to the airbag 11.

That is, in the second embodiment, too, the outlet ports 71 are formed intermittently along the circumference of the inflator body 18 such that inflation gases G exited the discharge ports 19 of the inflator body 18 outflow generally in the directions CP orthogonal to the axis of the inflator body 18 and radially about the inflator body 18. Further, each of the deflectors 75 is formed to correspond to one specific outlet port 71. With this configuration, an inflation gas G exited a specific outlet port 71 hits only a corresponding deflector 75 and a corresponding catch 77 that are located outside of the cover wall 69 proximate the outlet port 71. Accordingly, the gas G exited this specific outlet port 71X keeps hitting the corresponding catch 77X. Other gases G exited adjoining outlet ports 71Y and 71Z hit the catch 77X corresponding to the specific outlet port 71X only after they hit adjoining deflectors 75Y and 75Z and adjoining catches 77Y and 77Z that correspond to the adjoining outlet ports 71Y and 71Z. The other gases G at this point do not have such high flow speed as to thrust back the gas G from the catch 77X and hit the catch 77X.

Consequently, a gas G exited a certain outlet port 71 only hits a specific catch 77, so that residual particles S once caught by the specific catch 77 are prevented from being blown off by other gases from different directions. Accordingly, each of the catches 77 captures more residual particles S in an accumulating manner.

Moreover, each of the outlet ports 71 is located on a radially extending direction from the axial center C of the inflator body 18 that passes through a specific discharge port 19. With this configuration, even with the clearance H0 between the cover wall 69 and the inflator body 18, an inflation gas G exited one specific gas discharge port 19X flows radially about the axial center C of the inflator body 18 and immediately passes through the cover wall 69 via the corresponding outlet port 71X, and then passes through locations of the corresponding deflector 75X and catch 77X. That is, the gas G exited the specific discharge port 19X is securely prevented from heading for the adjoining outlet ports 71Y or 71Z. Additionally, inflation gases G exited adjoining discharge ports 19Y and 19Z of the inflator body 18 are blocked by an area 69*d* of the cover wall 69 on the periphery of the outlet port 71X including the lower edge 69*c*, and therefore will not directly hit residual particles S caught on the catch 77X corresponding to the specific outlet port 71X. That is, the gas G exited the specific outlet port 71X keeps on hitting the corresponding catch 77X via a fixed channel, and gases from other directions, i.e. gases exited the adjoining discharge ports 19Y and 19Z are prevented from directly hitting the residual particles S caught on the catch 77X corresponding to the outlet port 71X.

As a result, in the second embodiment, too, each of the gases G exited the outlet ports 71 is so stabilized as to pass through the fixed channel to hit the corresponding catch 77 such that each of the catches 77 captures residual particles S in a steady manner. Hence the catches 77 are enabled to capture more residual particles S, so that cleaned-up gases G are supplied into the airbag 11. That is, the same advantageous effects are achieved by the airbag apparatus M2 according to the second embodiment of the invention as well as by the airbag apparatus M1 of the first embodiment.

Furthermore, since the airbag apparatus M2 of the second embodiment deflects inflation gases G twice; firstly by the deflectors 55 and then by the catching planes 78 of the catches 77, it further reduces the momentum of the gases G before reaching the airbag 11, and therefore, the airbag 11 is prevented from abruptly and straightly projecting toward a passenger seated in the front passenger's seat, thereby deploying softly.

Figure 12:
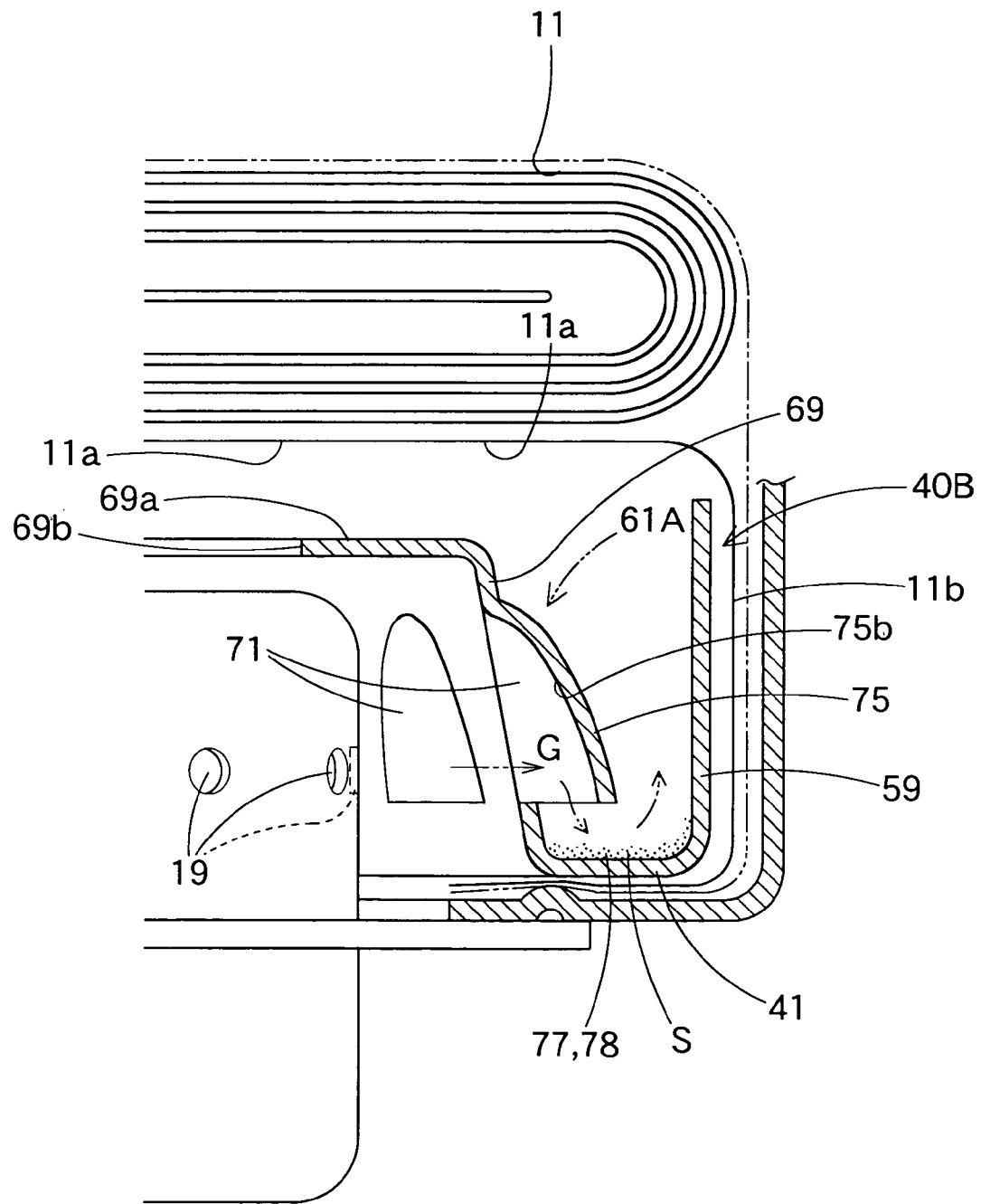
FIG. 12 is a partial enlarged schematic vertical section showing a modification of the retainer of the second embodiment.

Although the retainer 40/40A of the foregoing embodiments has been described as is comprised of two parts; the upper part 61/61A and lower part 64/64A, the retainer of the invention may be of a single entity as a retainer 40B shown in FIG. 12. This retainer 40B is formed by applying multiple pressing works on a single sheet metal as if the outer tubular portion 59 were disposed along an outer circumference of an upper part 61A.

In the first and second embodiments, the cover wall 49/69 with the outlet ports 51/71 are formed on the retainer 40/40A in such a manner as to extend upwardly from the inner circumference of the insert hole 47 of the retainer 40/40A. Other than this configuration, the cover wall of the invention may be formed on the case as will be described in the following third embodiment.

An airbag apparatus M3 according to the third embodiment differs from the foregoing embodiments only in a configuration of a retainer 80 and in that a cover wall 89 is formed on an inner circumference of the insert hole 24 of a case 22C. The airbag 11, inflator 17, airbag cover 31, the case 22C except the cover wall 89 have similar structures to those of the foregoing embodiments, and therefore, description of these components and members thereof will be omitted by using common reference numerals.

Figure 13:
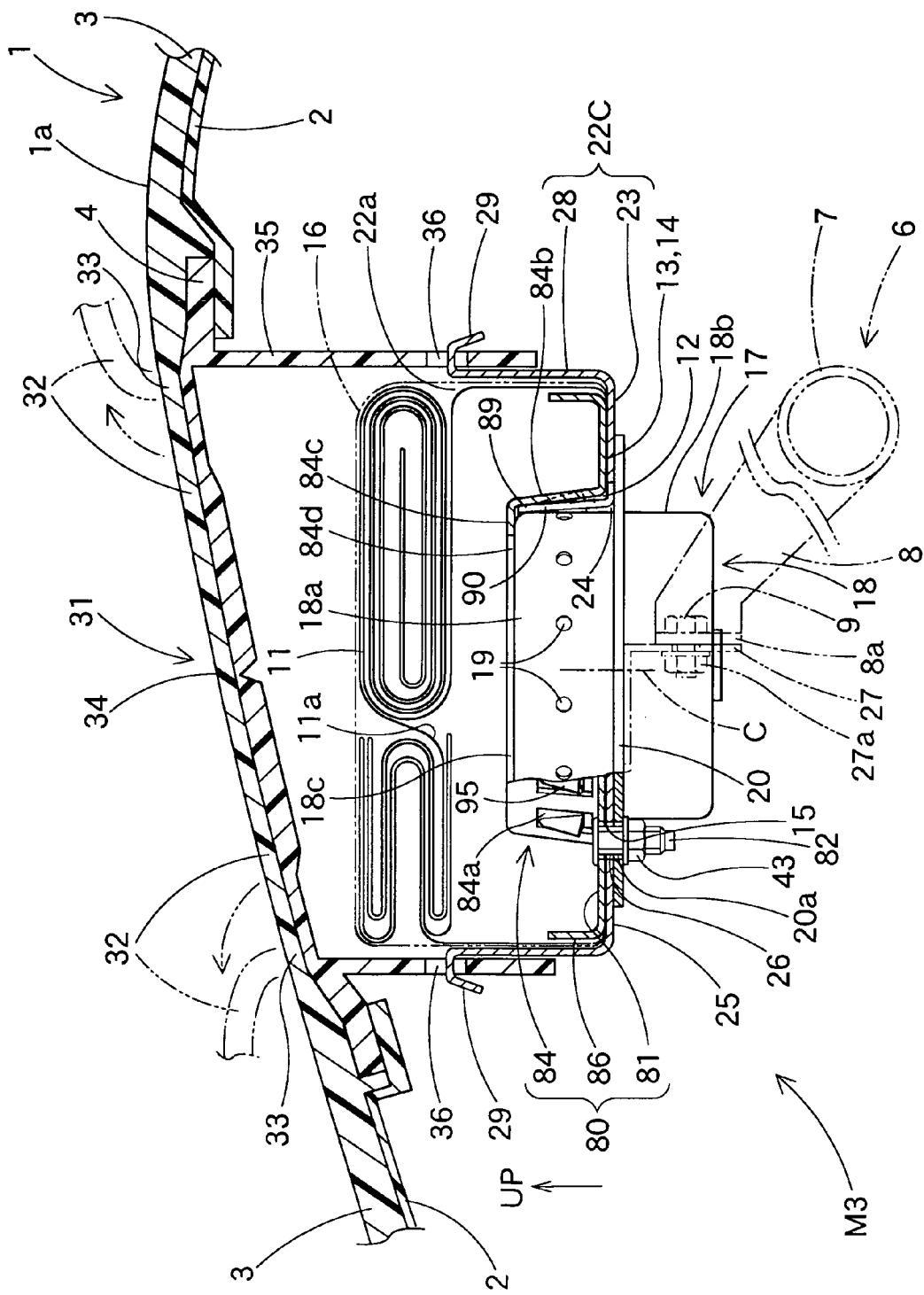
FIG. 13 is a schematic vertical section of an airbag apparatus according to the third embodiment of the invention, taken along a longitudinal direction of a vehicle.
Figure 14:
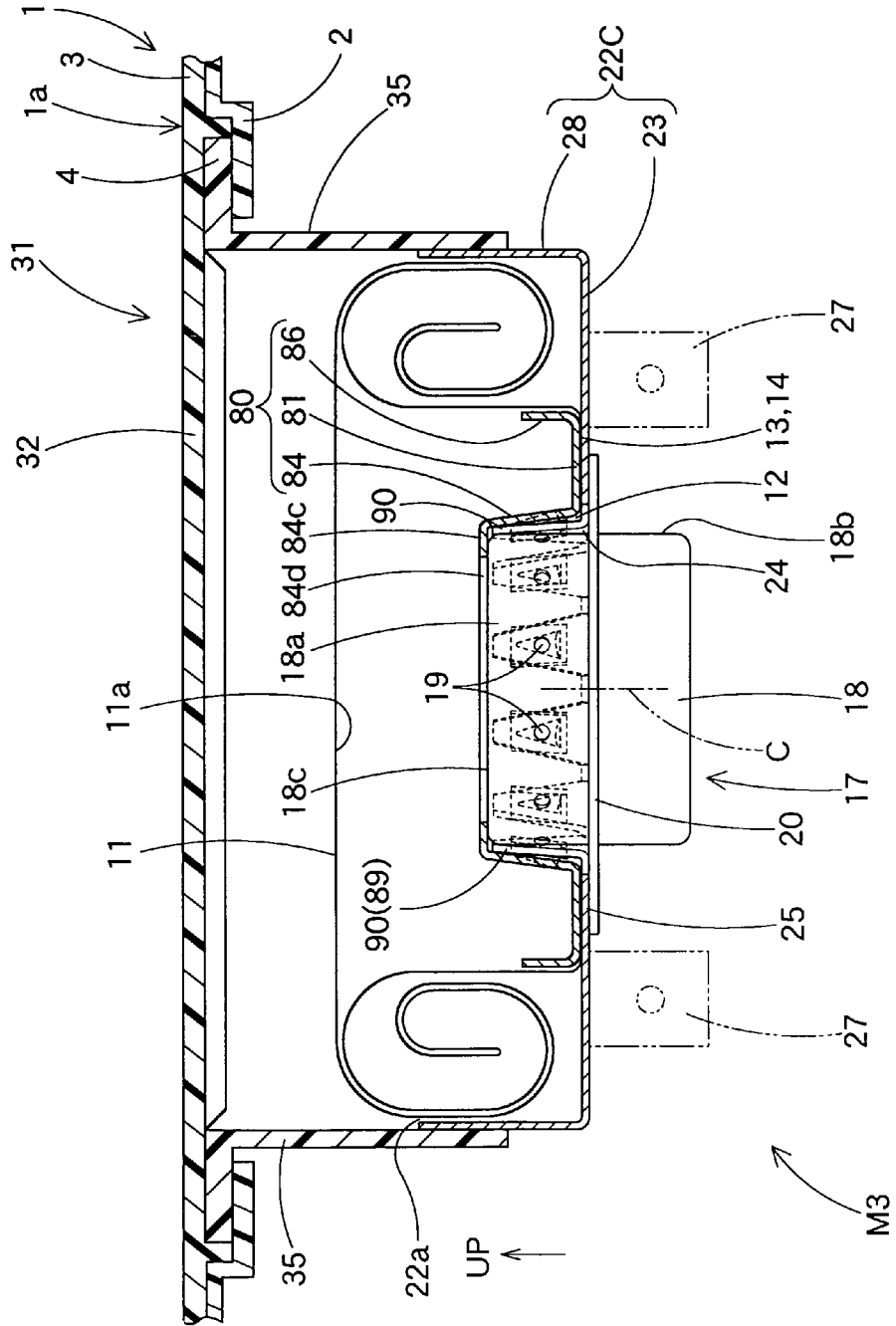
FIG. 14 is a schematic vertical section of the airbag apparatus of FIG. 13 taken along a transverse direction of a vehicle.
Figure 15:
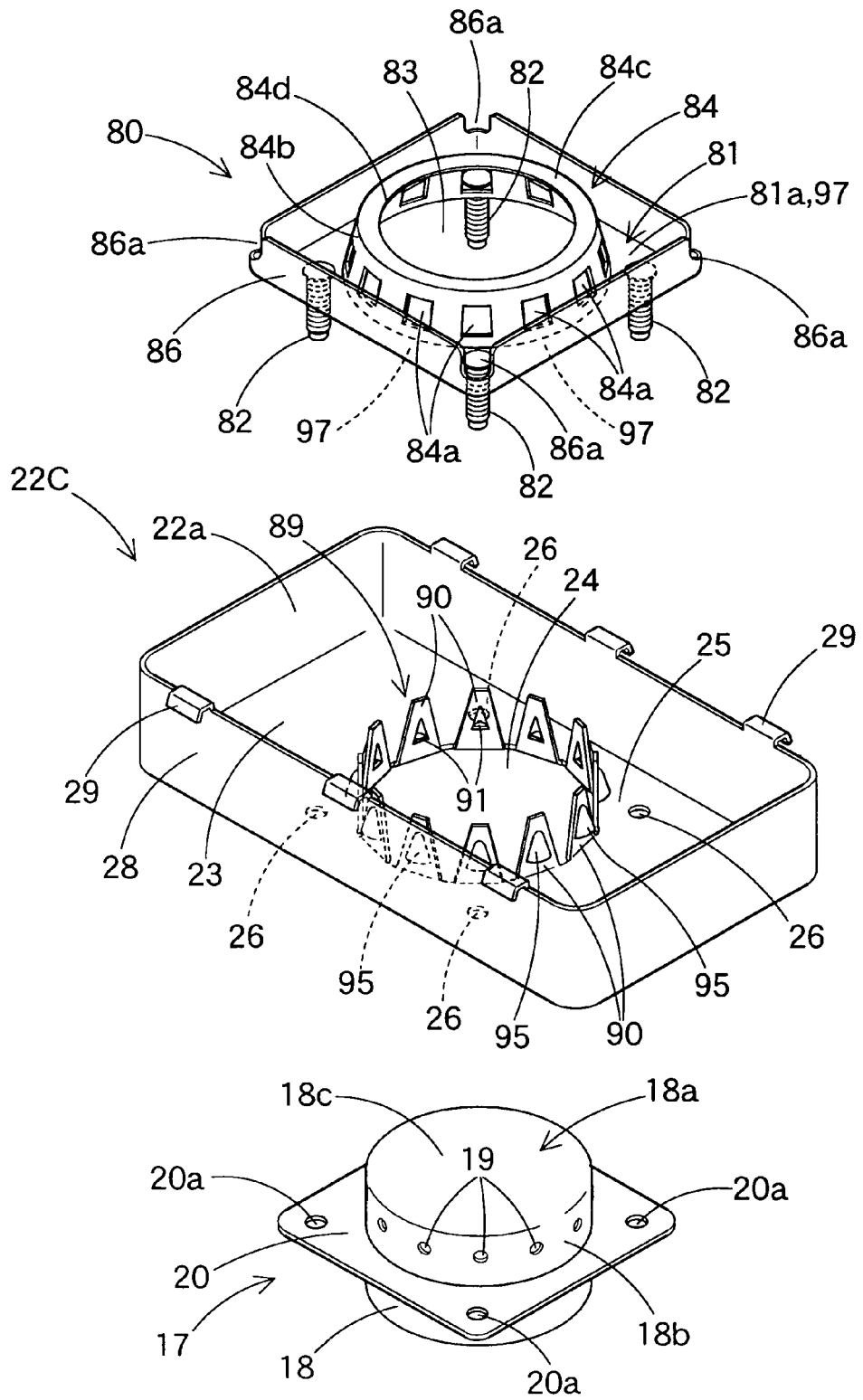
FIG. 15 illustrates a retainer, a case and an inflator in the third embodiment by perspective views.

As shown in FIGS. 13 to 15, a retainer 80 of the third embodiment is made of sheet metal and includes a hold-down portion 81 that holds down the mounting portion 14 of the airbag 11 from inside and an outer tubular portion 86 that extends upwardly from an outer circumference of the hold-down portion 81 in a generally square tubular fashion. The hold-down portion 81 has a generally annular contour and is provided with a round insert hole 83 having a generally same inner diameter as the gas inlet port 12 of the airbag 11. The hold-down portion 81 has a generally square outer circumference and on four corners thereof are bolts 82 that extend downward for attaching the airbag 11 and inflator 17 to the case 22C. As the bolts 42 of the retainer 40/40A in the first and second embodiments, the bolts 82 attach the airbag 11 to the mounting seat 25 of the bottom wall 23 of the case 22C as well as attach the inflator 17 to a lower side of the mounting seat 25 when passed through the mounting holes 15 of the airbag 11, mounting holes 26 of the bottom wall 23 of the case 22C, through holes 20*a* of the flange 20 of the inflator 17 and then fastened into the nuts 43. The outer tubular portion 86 includes at four corners thereof slits 86*a* that split up tops of four sides of the outer tubular portion 86.

The retainer 80 further includes a ring post 84 extending upwardly from an inner circumference of the insert hole 83 of the hold-down portion 81 generally in a tubular fashion. The ring post 84 includes apertures 84a for receiving later-described deflectors 95 formed on lugs 90 of the case 22C from the inner side. Each of the apertures 84a has a rectangular contour. The ring post 84 includes at a top region thereof a tubular support wall 84b for supporting outer sides 90b (FIG. 18B) of tops 90a of the lugs 90 in order to prevent such deformation of the lugs 90 as back away from the inflator body 18. On top of the support wall 84b are eaves 84c extending toward the inflator body 18. The eaves 84b are also located above the top plane 18c of the inflator body 18 and an inner surface 84d thereof (FIG. 15) is arranged at an inward position relative to a position generally above the outer circumference 18b of the inflator body 18 as the inflator 17 and retainer 80 are attached to the case 22C.

Referring to FIGS. 13 to 17, the case 22C is made of sheet metal into a generally rectangular parallelepiped contour provided with a rectangular opening 22a on top similarly to the case 22 of the first and second embodiments. The case 22C includes a bottom wall 23 having a rectangular plate shape and provided with an insert hole 24 for receiving an upper part 18a of the inflator 17 from lower side and a side wall 28 extending upwardly and toward the airbag cover 31 in a generally square cylindrical shape from an outer circumference of the bottom wall 23. The side wall 28 includes retaining pawls 29. The insert hole 24 is sized to receive the upper part 18a of the inflator body 18, but its diameter is smaller than the gas inlet port 12 of the airbag 11 or insert hole 83 of the retainer 80. On a peripheral area of the insert hole 24 of the bottom wall 23 are four mounting holes 26 for receiving four bolts 82 of the retainer 80, so that the peripheral area of the insert hole 24 acts as a mounting seat 25 for attachment of the airbag 11.

The bottom wall 23 of the case 22C includes a generally cylindrical cover wall 89 so extending upwardly from the inner circumference of the insert hole 24 as to be located around and proximate the circumference 18b of the inflator body 18. The cover wall 89 is comprised of a plurality of lugs 90. Twelve lugs 90 are formed to oppose each of the gas discharge ports 19 of the inflator 17 while surrounding the inflator body 18. Each of the lugs 90 includes an outlet port 91 for letting an inflation gas G exited the discharge port 19 out of the cover wall 89. The lugs 90 are formed by cutting and raising portions of the insert hole 24 on the bottom wall 23 intermittently along the periphery of the insert hole 24 to include one outlet port 91.

Similarly to the second embodiment, each of the outlet ports 91 is located on a radially extending direction from the axial center C of the inflator body 18 passing through a specific gas discharge ports 19, and has such a contour as an isosceles triangle that enlarges toward the bottom.

Figure 19:
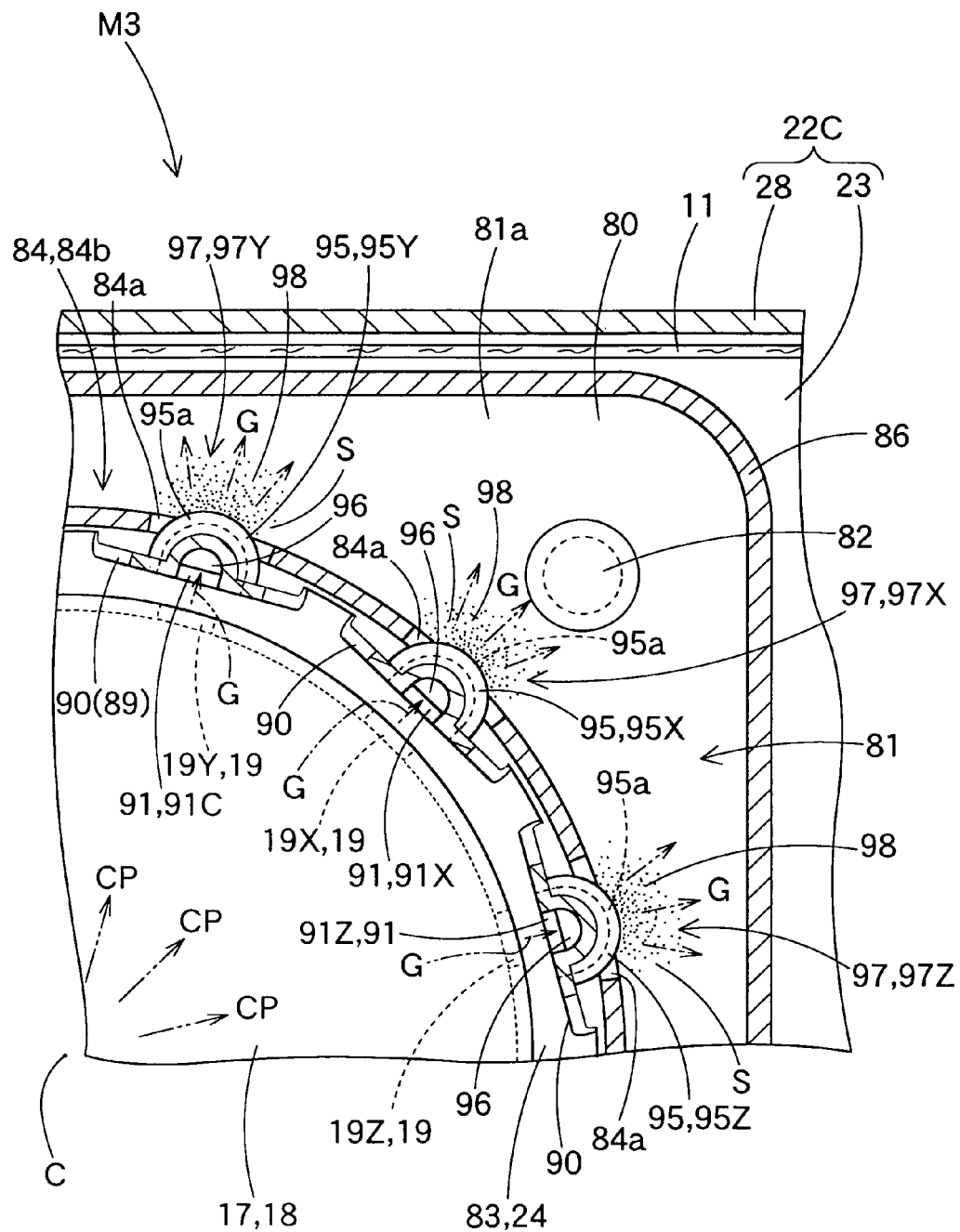
FIG. 19 is a partial enlarged cross section of the airbag apparatus of FIG. 13.
Figure 20:
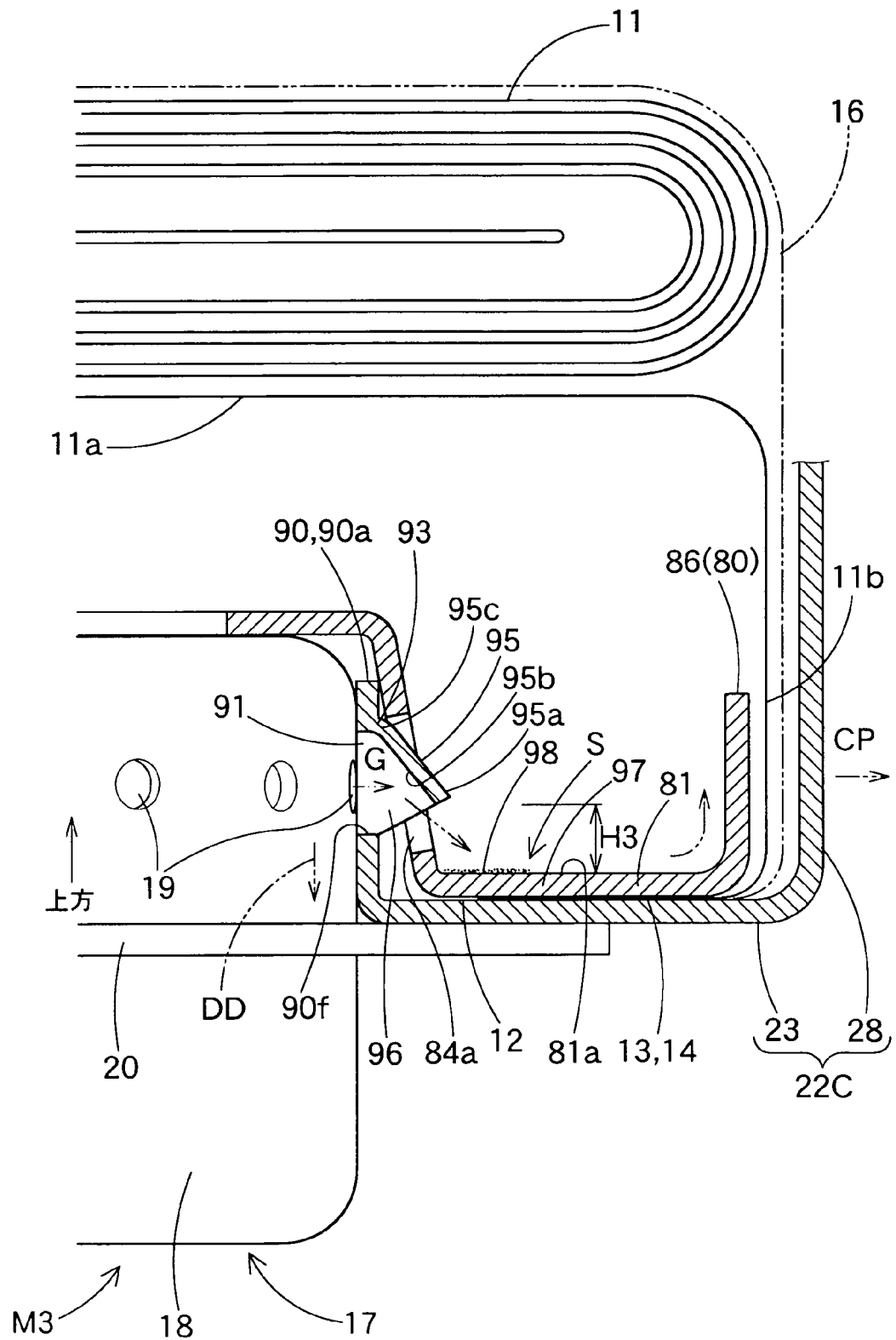
FIG. 20 is a partial enlarged vertical section of the airbag apparatus of FIG. 13.

As shown in FIGS. 19 and 20, each of the deflectors 95 are so formed on each of the lugs 90 to be displaced outward relative to the cover wall 89 so an inflation gas G passed through the outlet port 91 flows downward toward the hold-down portion 81 and includes an exit hole 96 at the lower edge 95a located above the hold-down portion 81 by a clearance H3 for releasing the gas G hit the deflector 95 along the hold-down portion 81 and radially about the axial center C of the inflator body 18. Catches 97 are located on a top plane 81a of the hold-down portion 81 of the retainer 80. Regions of the top plane 81a opposing the exit holes 96 in the vicinity of the cover wall 89 act as catching planes 98 of the catches 97 for capturing residual particles S.

Figure 16:
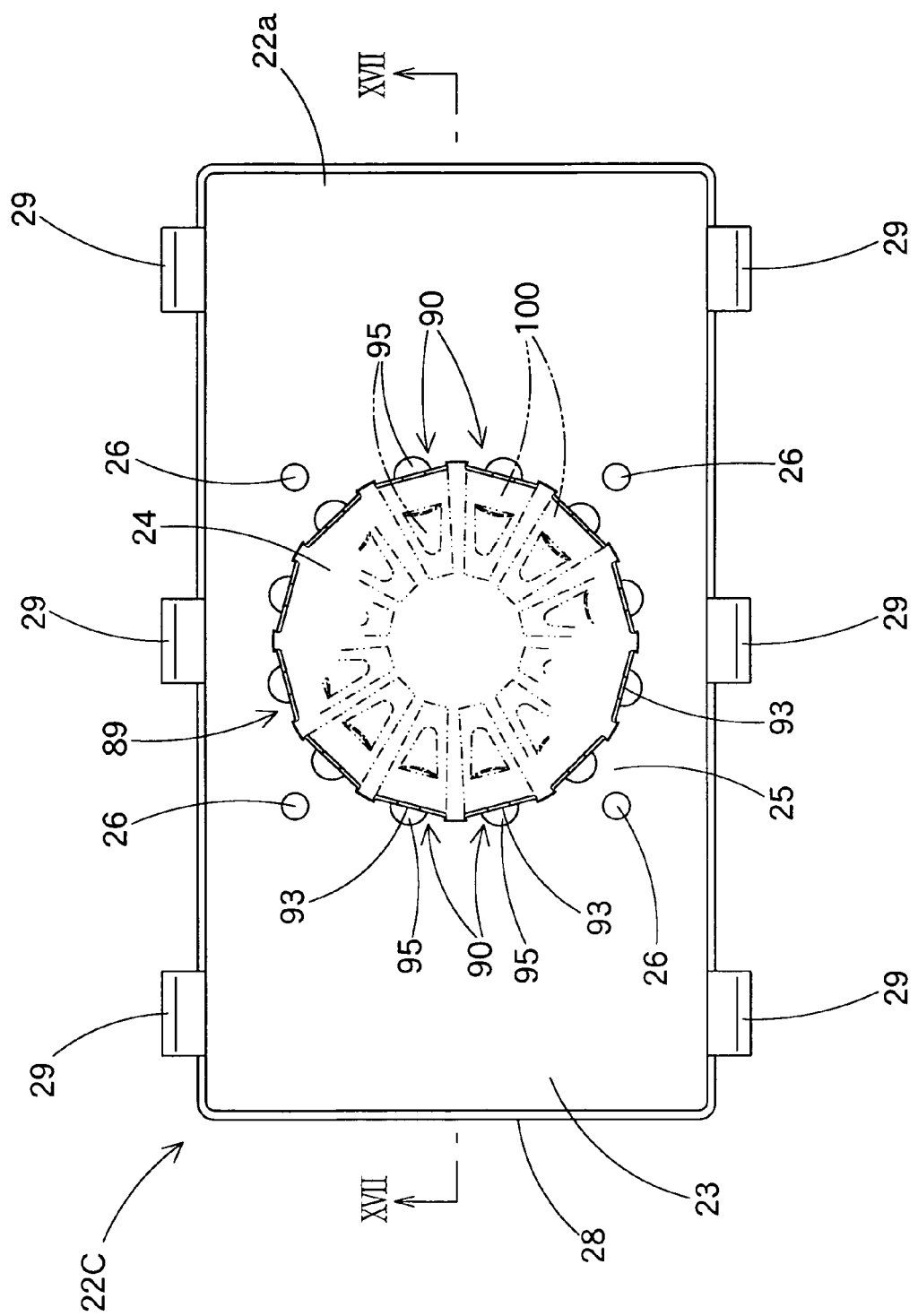
FIG. 16 is a plan view of the case of FIG. 15.
Figure 17:
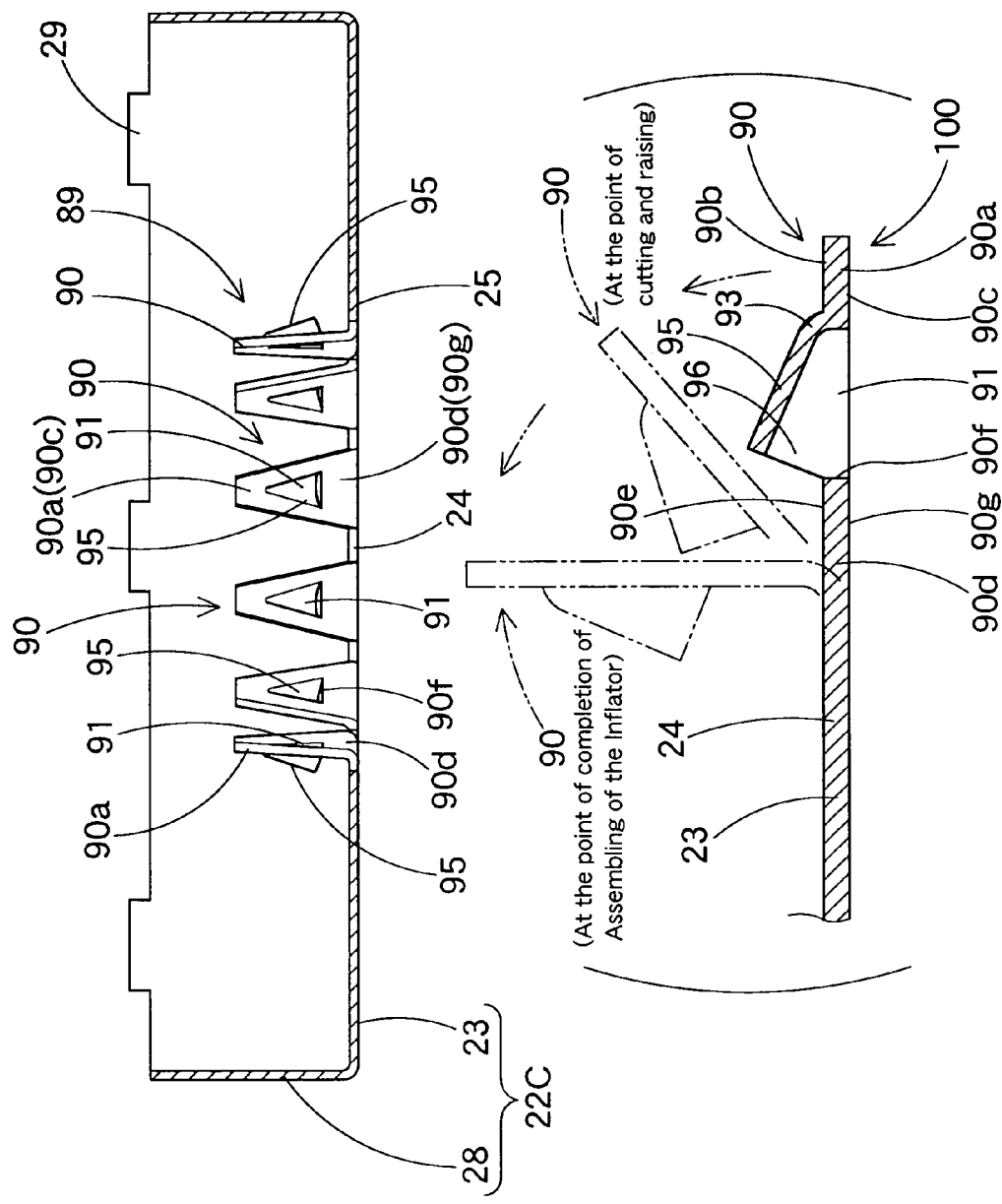
FIG. 17 is a vertical section of the case of FIG. 16 taken along line XVII-XVII.

The lugs 90 including the deflectors 95 are manufactured as follows; as double-dashed lines in FIGS. 16 and 17 illustrate, when the case 22C is manufactured of a sheet metal, an area of the bottom wall 23 to be stamped out for the insert hole 24 is processed to form regions 100 to be the lugs 90. Each of the regions 100 to be the lugs 90 is slit up at the location of the lower edge 90f of the outlet port 91 and an area by the lower edge 90f is extruded upwardly by pressing work. Then the regions 100 to be the lugs 90 are raised and thus forming the deflectors 95. Each of the deflectors 95 is also formed into such a half circular-conical tapered pipe that its plane 95b (FIG. 20) opposing the outlet port 91 bulges in an arcuate fashion about the axial center C of the inflator body 18 in a horizontal section of the inflator body 18 and draws apart from the body 18 as it goes downward as shown in FIG. 19. Accordingly, an upper end 95c of each of the deflectors 95, which continues from the cover wall 89, constitutes a restriction wall 93 that checks an upward outflow of an inflation gas G as shown in FIG. 20.

As in the second embodiment, each of the exit holes 96 is formed generally like a crescent moon (FIG. 19) and is located separate from the top plane 81a of the hold-down portion 81 and outside of a lower edge 90f of the outlet port 91 in an outer circumference 90e (FIG. 17) of a bottom region 90d of the lug 90 (FIG. 20). As described above, the regions of the top plane 81a of the hold-down portion 81 opposing the exit holes 96 outside of the cover wall 89 constitute the catches 97 of the third embodiment.

Figure 18A:
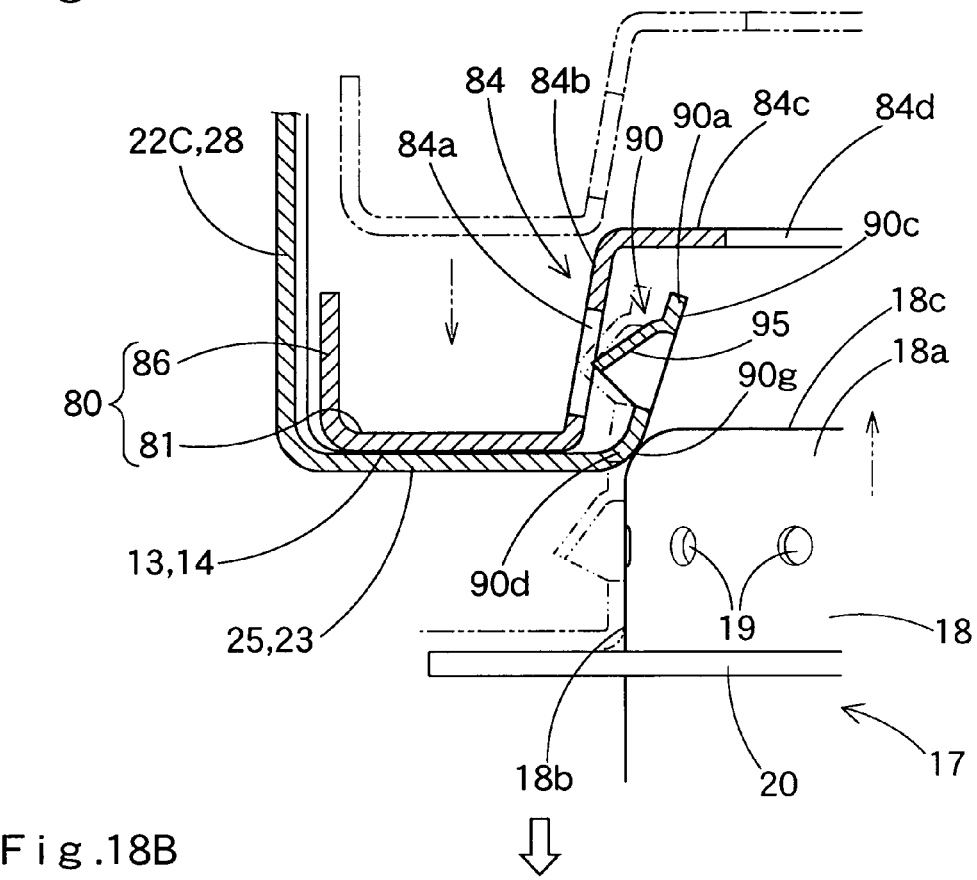
FIGS. 18A and 18B are partial enlarged vertical sections illustrating an assembling of the airbag apparatus of FIG. 13 in order.

The regions 100 to be the lugs 90 are not bent up to vertical orientations when subjected to the cut-and-raise process before assembling the case 22C with the retainer 80 or the airbag 12 as shown in a parenthesis of FIG. 17 or in FIG. 18A. Otherwise the deflectors 95 may be obstacle to the assembling work. It is not until the inflator body 18 is assembled into the airbag apparatus M3 that the lugs 90 are bent to the vertical orientation.

Figure 18B:
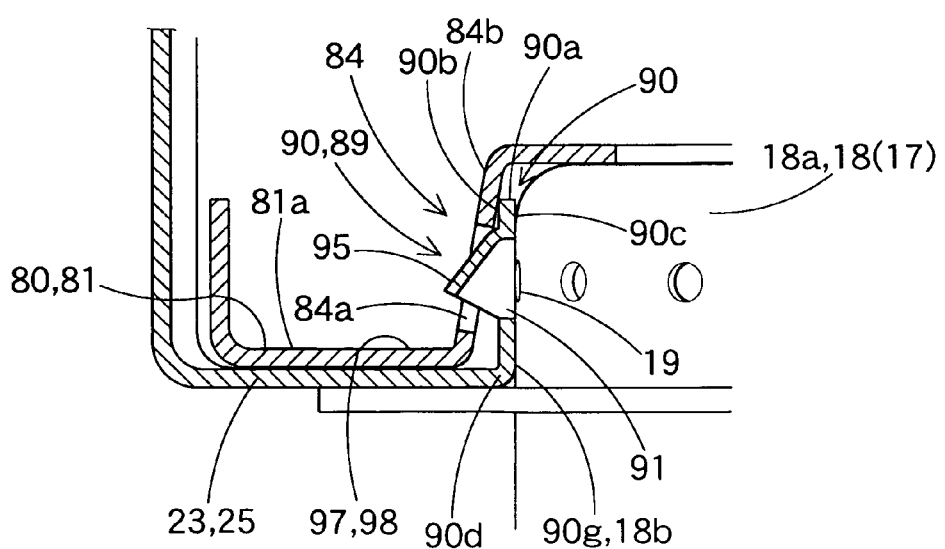

More specifically, as shown in FIGS. 18A and 18B, when the inflator body 18 is inserted into the insert hole 24 of the case 22C from below after the folded-up airbag 11 is placed on the bottom wall 23 of the case 22C while housing the retainer 80 therein so the bolts 82 of the retainer 80 are put through the mounting holes 26 of the case 22C and through holes 20a of the flange 20, the lugs 90 are pushed by a top plane 18c of the circumference 18b of the inflator body 18 and bend such that upper ends 90a draw apart from the insert hole 24 until the deflectors 95 are received by the apertures 84a of the retainer 80 and positioned at predetermined positions.

At this time, not only inner surfaces 90c of the upper ends 90a of the lugs 90 but also inner surfaces 90g of bottoms 90d are pushed and bent by the top plane 18c of the outer circumference 18b of the inflator body 18. When the lugs 90 are bent up to the vertical orientation, outer surfaces 90b of the upper ends 90a of the lugs 90 abut against the support wall 84b located at the top of the ring post 84 of the retainer 80 while the inner surfaces 90c of the upper ends 90a abut against the outer circumference 18b of the inflator body 18 proximate the top plane 18c, so that the upper ends 90a of the lugs 90 are clamped between the support wall 84b of the retainer 80 and inflator body 18. The inner surfaces 90g of the bottoms 90d abut against the outer circumference 18b of the inflator body 18 as well. That is, the inner surfaces 90c and 90g of the tops 90a and bottoms 90d in the peripheries of the outlet ports 91 of the lugs 90 abut against peripheries of the gas discharge ports 19 on the outer circumference 18b of the inflator body 18. Consequently, each of the outlet ports 19 communicates with each of the gas discharge ports 19.

After the airbag 11 and inflator 17 are assembled with the case 22C by fastening the bolts 82 of the retainer 80 projecting from the through holes 20a of the flange 20 into nuts 43, the side wall 28 of the case 22C is inserted within the joint wall 35 of the airbag cover 31 in the dashboard 1 mounted on the vehicle, and the retaining pawls 29 of the case 22 are inserted into the retaining holes 36 of the joint wall 35 such that the retaining pawls 29 are retained by the joint wall 35 as in the first and second embodiments. If then the bolts 9 are further fastened into the nuts 27a of the brackets 27 through the mounting seats 8a, the airbag apparatus M3 is mounted on the vehicle.

In operation of the airbag apparatus M3, inflation gases G exited the discharge ports 19 of the inflator 17 pass through the outlet ports 91 of the lugs 90 or cover wall 89 that are communicated with the gas discharge ports 19 as shown in FIGS. 19 and 20 and immediately hit the deflectors 95 to be deflected downward DD toward the hold-down portion 81, and then bump the catching planes 98 of the catches 97 formed on the top plane 81a of the hold-down portion 81. Then the gases G flow radially outwardly about the axial center C of the inflator body 18 via the exit holes 96 formed between the lower edges 95a of the deflectors 95 and the hold-down portion 81 or the catches 97. When the gases G hit the catching planes 98 of the catches 97 and turn outwardly, tacky and heavy residual particles S adhere to the catching planes 98, and subsequent particles S adhere to the particles S which had adhered to the catches 97 and thus accumulate on the catches 97. As a result, cleaned-up gas G is fed to the airbag 11 and the same advantageous effect as the second embodiment is obtained by the third embodiment as well.

In the third embodiment, moreover, the peripheries of the outlet ports 91 on the inner surface of the cover wall 89 are configured to abut against the outer circumference 18b of the inflator body 18 such that the outlet ports 91 communicate with the discharge ports 19 of the inflator 17. This configuration guides an inflation gas G exited a specific discharge port 19X to immediately pass the corresponding outlet port 91X communicating with the discharge port 19X and head for the corresponding deflector 95X and catch 97X but not toward adjoining outlet port 91Y or 91Z even though the gas G is discharged conically with a certain spray angle.

The lugs 90 of the third embodiment are comprised of portions of the sheet metal on the location of the insert hole 24 of the case 22C that would otherwise be punched out for discard. That is, the configuration of the case 22C of the third embodiment makes efficient use of the material. The lugs 90 are easy to deform since they are intermittently formed along the periphery of the insert hole 24 and supported at only one ends like a cantilever. However, the support wall 84b of the ring post 84 extending from the hold-down portion 81 of the retainer 80 supports and prevents the lugs 90 from deforming away from the inflator body 18 even if inflation gases G flowing outwardly hit the lugs 90. Therefore, the outlet ports 91 and peripheries thereof of the lugs 90 stay in place and allow the gases G to flow steadily toward the deflectors 95 and catches 97.

Furthermore, in the third embodiment, each of the lugs 90 includes the restriction wall 93 that connects the upper hem of the outlet port 91 and the upper end 95c of the deflector 95 for preventing an upward outflow of inflation gas G. The ring post 84 of the retainer 80 includes at its top region the tubular support wall 84b for supporting the lugs 90 and apertures 84a located below the support wall 84b for receiving the deflectors 95 from inner side. The lugs 90 are so configured as to bend upwardly when pushed by the inflator body 18 set in the insert hole 24 of the case 22C from the lower side such that the deflectors 95 are put through the apertures 84a of the ring post 84.

With this configuration, the deflectors 95 are smoothly set in the apertures 84a of the ring post 84 to project outwardly in assembling with the case 22C even if the deflectors 95 are formed to project largely from the peripheries of the outlet ports 91. Since the deflectors 95 can be formed large, the outlet ports 91 can be enlarged as well so that inflation gases G exited the discharge ports 19 of the inflator 17 smoothly flow toward the deflectors 95 via the outlet ports 91. Further, since the peripheries of the outlet ports 91 contact the inflator body 18, the gases G exited the discharge ports 19 immediately pass through the outlet ports 91 communicated therewith and head for the deflectors 95. In addition, the restriction walls 93 prevent upward outflows of the gases G when the gases G pass through the outlet ports 91 of the cover wall 89, and thereby preventing the gases G from directly flowing into the airbag 11 as contain residual particles S. Accordingly damages to the airbag 11 by the residual particles S will be reduced.

Figure 21:
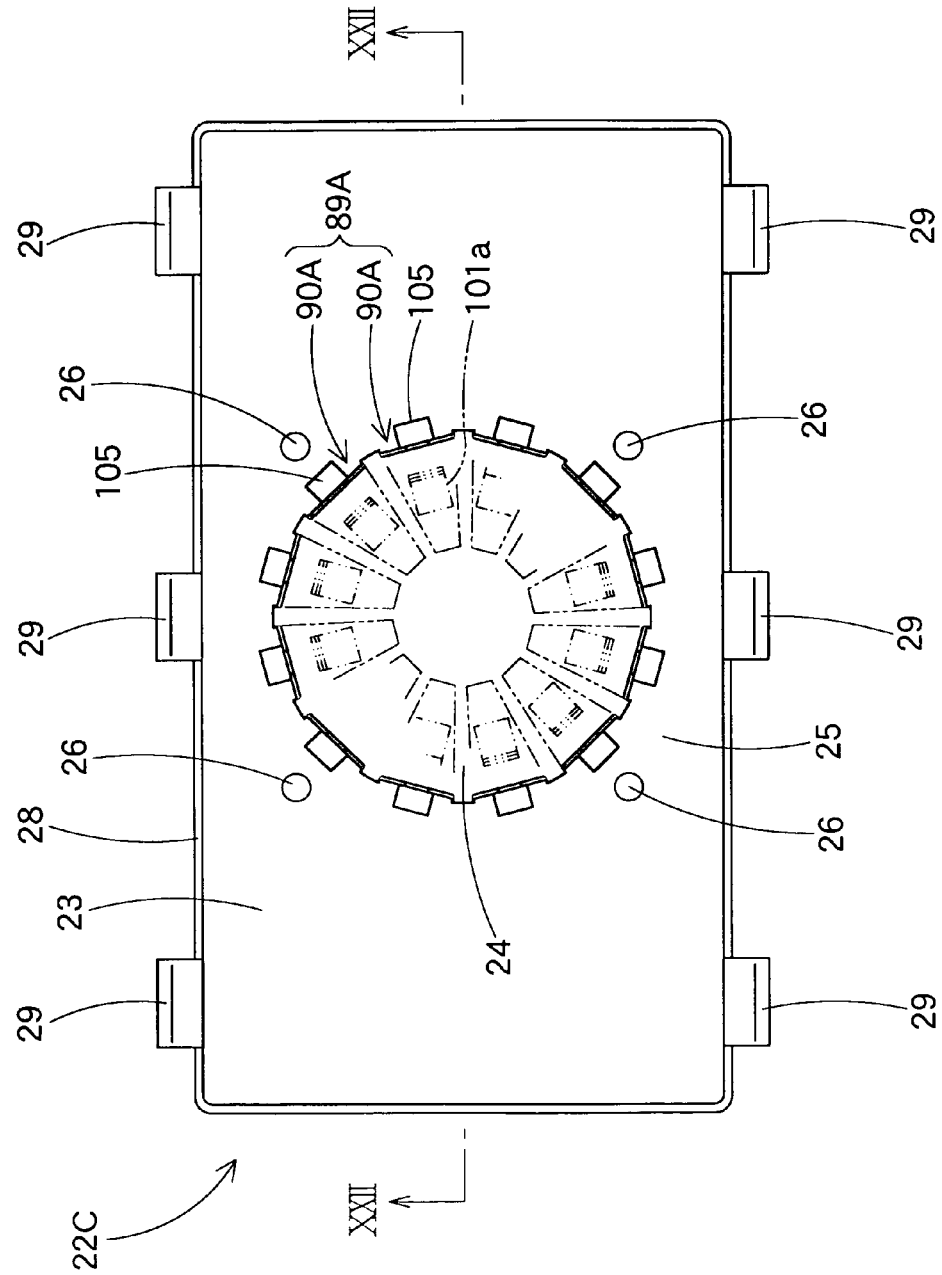
FIG. 21 is a plan view of a case showing a modification of lugs in the third embodiment.
Figure 22:
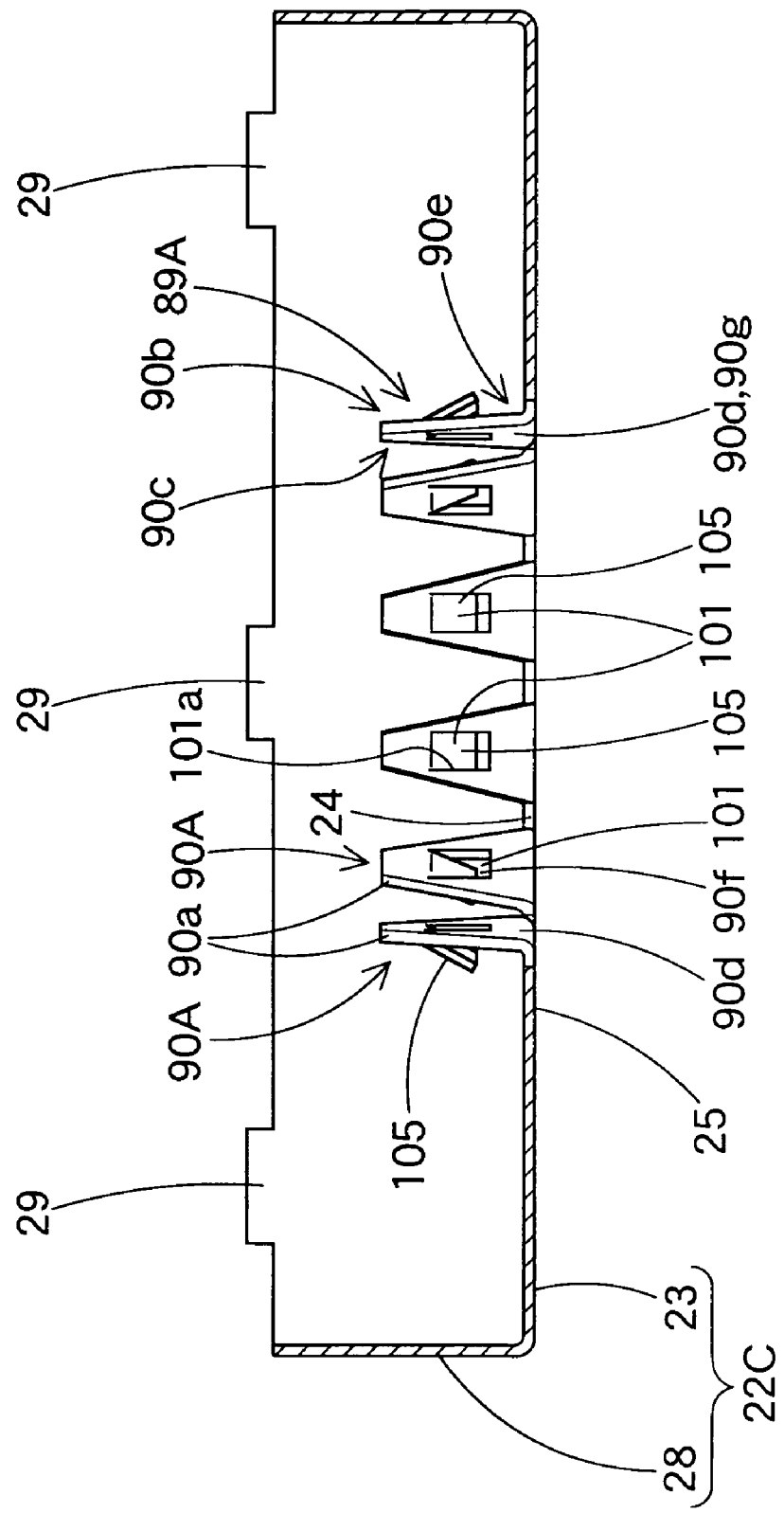
FIG. 22 is a vertical section of the case of FIG. 21 taken along line XXII-XXII of FIG. 21.
Figure 23:
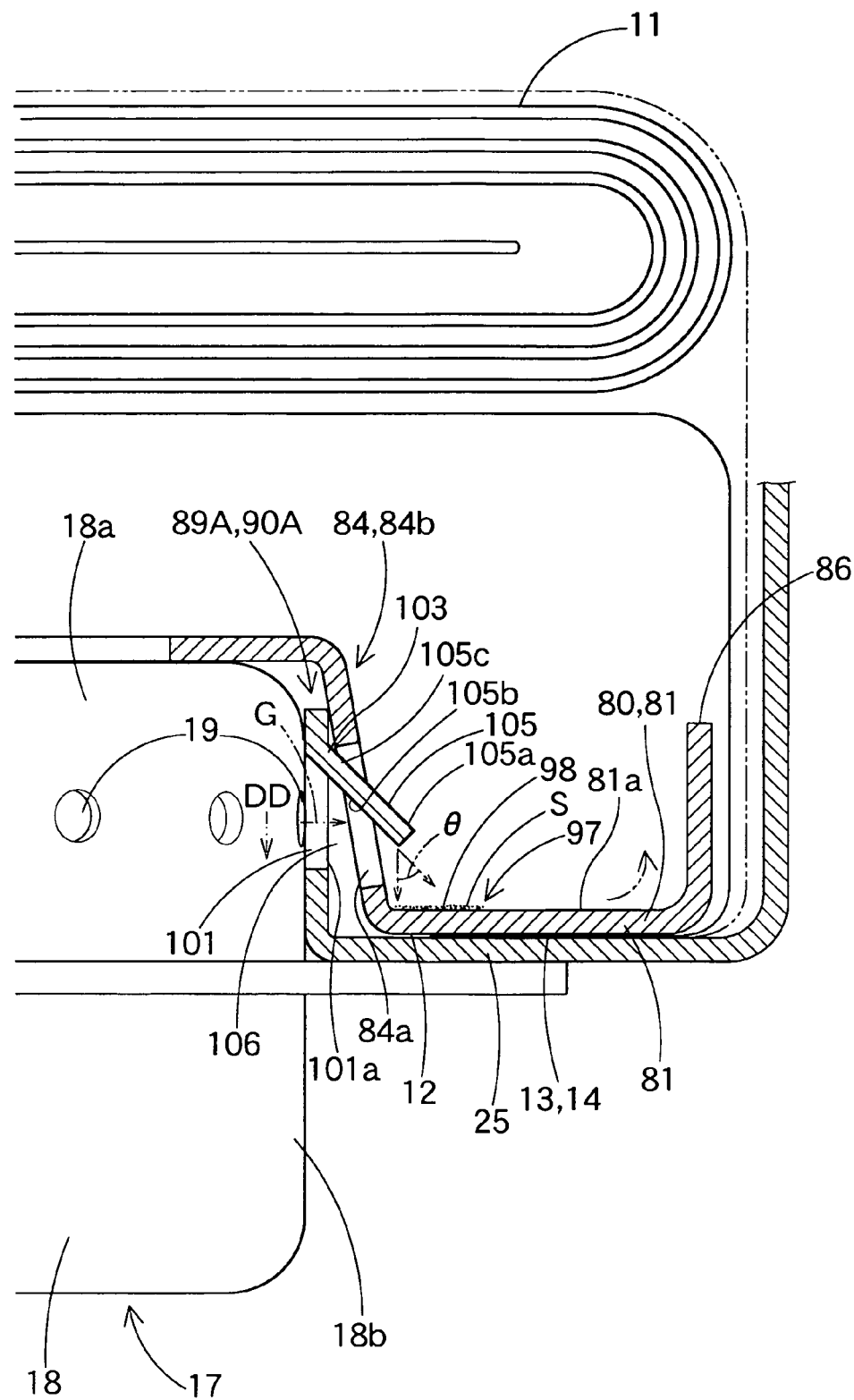
FIG. 23 is a partial enlarged vertical section of an airbag apparatus that employs the case of FIG. 21.

The deflectors 95 of the third embodiment each is formed into a half circular-conical tapered pipe bulging away from the inflator body 18 as in the second embodiment. Alternatively, the deflector may be formed like a deflector 105 shown in FIGS. 21 to 23. The deflectors 105 are formed by cutting and raising from a cover wall 89A or lugs 90A into a generally rectangular plate shape. Each of the deflectors 105 continues from an upper hem of an outlet port 101 on the cover wall 89A at its top 105c that acts as a restriction wall 103 for preventing an upward outflow of inflation gas G. The bottom 105a of the deflector 105 is separated from a periphery 101a of the outlet port 101. Each of the deflectors 105 is configured to deflect an inflation gas G exited the outlet port 101 obliquely downward toward the hold-down portion 81, i.e., at about an angle θ of 45° from the downward direction DD, and is provided at the bottom 105a located above the hold-down portion 81 by a clearance with an exit hole 106 for releasing the gas G hit an opposing plane 105b of the deflector 105 along the hold-down portion 81 and radially about the axial center C of the inflator body 18. As in the second embodiment, the catches 97 are located on the top plane 81a of the hold-down portion 81 of the retainer 80. Regions of the top plane 81a opposing the exit holes 106 in the vicinity of the cover wall 89 act as catching planes 98 of the catches 97 for capturing residual particles S. This configuration attains the same advantageous effects as in the third embodiment. In this configuration, too, the lugs 90A are formed by cutting and raising portions of the sheet metal on the location of the insert hole 24 on the bottom wall 23 of the case 22C. Further, the lugs 90A are so configured as to bend upwardly when pushed by the inflator body 18 set in the insert hole 24 of the case 22C from the lower side such that the deflectors 105 are put through the apertures 84a of the ring post 84. The upper ends 90a of the lugs 90A are supported by the support wall 84b of the ring post 84.

It will also be appreciated that the cover wall 49/69 of the retainer 40/40A in the first/second embodiment is configured such that peripheries of the outlet ports 51/71 abut against the outer circumference 18b of the inflator body 18 so the discharge ports 19 communicate with the outlet ports 51/71.

On the contrary, the cover wall 89 on the case 22C in the third embodiment may be configured such that peripheries of the outlet ports 91 are separated from the outer circumference 18b of the inflator body 18 by a clearance H0.

With respect to the configuration of the deflector, it is sufficient that it deflects an inflation gas G away from the outlet port on the cover wall and within such an angle θ as ranges from the direction CP orthogonal to the axial center C of the inflator body 18, i.e. a direction parallel to the hold-down portion 41/81, the periphery 13 of the inlet port 12 of the airbag 11, or the mounting seat 25 of the case 22/22C, to the downward direction DD extending toward the hold-down portion 41/81. Therefore, the deflectors 75 of the second embodiment may be configured to deflect gases G obliquely downward at 45°, not downward DD, like the deflector 105 of the modified third embodiment, or may also be configured to deflect gases G in multiple stages before reaching the catches.

The configurations that the case 22C includes the cover wall 89 at the inner circumference of the insert hole 24 or that the retainer 41/81 includes the cover wall 49/69 at the inner circumference of the hold-down portion 41/81 in the foregoing embodiments are conducible to reducing the number of parts or processes of assembling in comparison with an instance where the cover wall are separately prepared from the case or retainer. Without considering this advantage, however, the cover wall may be formed separately from the case or retainer.

Although the foregoing embodiments have been described as applied to the airbag apparatus M1/M2/M3 for a front passenger's seat, the present invention is applicable to various other airbag apparatuses such as for a driver's seat, for knee protection or pedestrian protection as long as the apparatus is such that a pyrotechnic inflator is attached to a case and an airbag is attached to the case at a periphery of a gas inlet using a retainer.

What is claimed is:

1. An airbag apparatus comprising:
   an airbag including an inlet port for introducing inflation gas;
   a pyrotechnic inflator that generates a gas for inflating the airbag by chemical reaction, the inflator including a columnar body that includes on and along an outer circumference of an upper part thereof discharge ports for discharging the gas;
   a case that houses the airbag in a folded state and holds the inflator, the case including an insert hole for receiving the upper part of the inflator body where the discharge ports are located and a mounting seat arranged around the insert hole on an upper face of the case to which mounting seat a peripheral region of the inlet port of the airbag is attached;
   an annular retainer that attaches the peripheral region of the inlet port of the airbag to the mounting seat of the case, the retainer including a hold-down portion that holds down the peripheral region of the inlet port of the airbag and is mounted on the case;
   a cover wall having a tubular contour and disposed around and proximate the outer circumference of the inflator body set in the case in such a manner as to extend upwardly from the vicinity of an inner edge of the hold-down portion of the retainer, the cover wall including a plurality of outlet ports formed intermittently to face the circumference of the inflator body so as to release the gas exited the discharge ports of the inflator body generally in a direction orthogonal to an axis of the inflator body and radially about the inflator body; and
   a plurality of deflectors formed to oppose the outlet ports on the outside of the cover wall and above the hold-down portion of the retainer for deflecting the gas exited the outlet ports of the cover wall away from the outlet ports and within a range of angle from the direction orthogonal to the axis of the inflator body to a downward direction extending toward the hold-down portion, each of the plurality of deflectors being configured as a catch to capture residual particles contained in the gas when receiving the gas,
   wherein the cover wall includes a restriction wall that connects an upper hem of each of the outlet ports and an upper end of each of the deflectors for preventing an upward outflow of inflation gas.

2. The airbag apparatus of claim 1 wherein the plurality of outlet ports are equal in number to the discharge ports of the inflator body and each of the outlet ports is located on an extension of a discharging direction of a gas exiting from one specific discharge port corresponding to the outlet port.

3. The airbag apparatus of claim 2 wherein a clearance is formed between the cover wall and the outer circumference of the inflator body.

4. The airbag apparatus of claim 2 wherein peripheries of the outlet ports on an inner surface of the cover wall abut against peripheries of the discharge ports on the outer circumference of the inflator body.

5. The airbag apparatus of claim 1 wherein:
   each of the deflectors is formed to stand vertically on a radially extending position about the axial center of the inflator body at each of the outlet ports;
   each of the deflectors is provided, between both ends thereof in the circumferential direction of the inflator body and the cover wall, with clearances each of which acts as an exit hole that releases inflation gas toward opposite directions along the circumferential direction of the inflator body after the gas hit the deflector; and
   each of the deflectors includes on a side opposing the outlet port a catching plane that captures residual particles of the gas when the gas exits from the exit holes.

6. The airbag apparatus of claim 1 wherein:
   each of the deflectors has such a contour as deflects an inflation gas exited the outlet port downward toward the hold-down portion and includes an exit hole at a lower edge thereof located above the hold-down portion by a clearance for releasing the gas hit the deflector along the hold-down portion and radially about the axial center of the inflator body; and
   regions on a top plane of the hold-down portion opposing the exit holes act as the catches for capturing residual particles of the gas.

7. The airbag apparatus of claim 1 wherein the retainer includes an outer tubular portion having a tubular contour that is continuous with an entire outer circumference of the hold-down portion and is greater in height than a top of the cover wall.

8. The airbag apparatus of claim 1 wherein the cover wall is formed on the case to extend upwardly from a periphery of the insert hole of the case.

9. The airbag apparatus of claim 8 wherein:
   the case is made of sheet metal;
   the cover wall includes a plurality of lugs disposed intermittently along the periphery of the insert hole to include each one said outlet port, the lugs being continuous with a bottom wall of the case as a result of cutting and raising portions of the sheet metal on a location of the insert hole on the bottom wall; and
   the retainer includes a generally cylindrical ring post that extends upwardly from the hold-down portion and surrounds the lugs to support the lugs for preventing such deformation of the lugs as back away from the inflator body.

10. The airbag apparatus of claim 9 wherein:
    each of the lugs includes a restriction wall that connects an upper hem of the outlet port and an upper end of the deflector for preventing an upward outflow of inflation gas;
    the ring post includes at a top region thereof a support wall for supporting the lugs and apertures located below the support wall for receiving the deflectors from an inner side; and the lugs are so configured as to bend upwardly such that the deflectors are put through the apertures of the ring post when pushed by the inflator body set in the insert hole of the case from the lower side.

11. An airbag apparatus comprising:

an airbag including an inlet port for introducing inflation gas;

a pyrotechnic inflator that generates a gas for inflating the airbag by chemical reaction, the inflator including a columnar body that includes on and along an outer circumference of an upper part thereof discharge ports for discharging the gas;

a case that houses the airbag in a folded state and holds the inflator, the case including an insert hole for receiving the upper part of the inflator body where the discharge ports are located and a mounting seat arranged around the insert hole on an upper face of the case to which mounting seat a peripheral region of the inlet port of the airbag is attached;

an annular retainer that attaches the peripheral region of the inlet port of the airbag to the mounting seat of the case, the retainer including a hold-down portion that holds down the peripheral region of the inlet port of the airbag and is mounted on the case;

a cover wall having a tubular contour and disposed around and proximate the outer circumference of the inflator body set in the case in such a manner as to extend upwardly from the vicinity of an inner edge of the hold-down portion of the retainer, the cover wall including a plurality of outlet ports formed intermittently to face the circumference of the inflator body so as to release the gas exited the discharge ports of the inflator body generally in a direction orthogonal to an axis of the inflator body and radially about the inflator body;

a plurality of deflectors formed to oppose the outlet ports on the outside of the cover wall and above the hold-down portion of the retainer for deflecting the gas exited the outlet ports of the cover wall away from the outlet ports and within a range of angle from the direction orthogonal to the axis of the inflator body to a downward direction extending toward the hold-down portion, each of the plurality of deflectors being configured as a catch to capture residual particles contained in the gas when receiving the gas, wherein:

the cover wall is formed on the retainer to extend upwardly from the inner edge of the hold-down portion of the retainer, the retainer includes a flange that extends up to the vicinity of an inner edge of the insert hole of the case at a lower side of the outlet ports, and the retainer is comprised of:

an upper part that constitutes an upper side of the hold-down portion including the cover wall and deflectors, the upper part including at an outermost region thereof an annular attachment ring provided with a plurality of attaching elements for attaching the whole retainer to the periphery of the insert hole of the case; and a lower part that constitutes a lower side of the hold-down portion, the lower part including the flange of the retainer, an annular hold-down ring provided with through holes for receiving the attaching elements, and an outer tubular portion that is formed continuous with an entire outer circumference of the hold-down portion outside of the attachment ring of the upper part and is greater in height than a top of the cover wall.

* * * * *